United States Patent
Perlin

(10) Patent No.: US 6,877,857 B2
(45) Date of Patent: Apr. 12, 2005

(54) STEERABLE LIGHTFIELD DISPLAY

(75) Inventor: Kenneth Perlin, New York, NY (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 10/315,292

(22) Filed: Dec. 9, 2002

(65) Prior Publication Data

US 2003/0107712 A1 Jun. 12, 2003

Related U.S. Application Data

(60) Provisional application No. 60/339,557, filed on Dec. 11, 2001.

(51) Int. Cl.[7] .................. G03B 21/26; G03B 35/08; G02B 27/22; G02B 21/60; H04N 13/04
(52) U.S. Cl. .................. 353/7; 353/10; 353/94; 359/464; 359/463; 359/458; 352/57; 352/60; 352/61; 348/42; 348/51
(58) Field of Search .................. 353/7, 10, 94; 359/464, 463, 458; 352/57, 60, 61; 348/42, 51; 396/324

(56) References Cited

U.S. PATENT DOCUMENTS

| | | | | |
|---|---|---|---|---|
| 5,855,425 A | * | 1/1999 | Hamagishi | 353/7 |
| 6,215,590 B1 | * | 4/2001 | Okano | 359/464 |
| 6,278,546 B1 | * | 8/2001 | Dubin et al. | 359/452 |
| 6,449,090 B1 | * | 9/2002 | Omar et al. | 359/465 |
| 2002/0101658 A1 | * | 8/2002 | Hoppenstein | 359/466 |
| 2003/0025995 A1 | * | 2/2003 | Redert et al. | 359/464 |
| 2003/0038922 A1 | * | 2/2003 | Ferrell | 352/85 |

* cited by examiner

Primary Examiner—Russell Adams
Assistant Examiner—Melissa J Koval
(74) Attorney, Agent, or Firm—Ansel M. Schwartz

(57) ABSTRACT

An apparatus for showing images. The apparatus includes a screen. The apparatus includes a mechanism for displaying a distinct and separate image for each of a number of different observers simultaneously on the screen. A method for showing images.

23 Claims, 19 Drawing Sheets

LC
90

SLM
110

II
80

STEERABLE LIGHTFIELD DISPLAY

This application claims the benefit of U.S. Provisional Application No.: 60/339,557 filing date Dec. 11, 2001.

FIELD OF THE INVENTION

The present invention is related to showing images. More specifically, the present invention is related to showing images on a screen so there is a distinct and separate image shown independently for each eye of a number of different observers simultaneously on the screen, so that each observer can see an image stereoscopically.

BACKGROUND OF THE INVENTION

The purpose of the steerable lightfield display (SLF) is to provide large-scale stereoscopic viewing to one or more binocular observers standing at various distances in front of a large display screen, while allowing each eye of each observer to simultaneously be shown a different image.

As display screens increase in size, it becomes prohibitively expensive to achieve the above-stated purpose by use of an electro-optically active screen, such as one composed of computer-switched liquid crystal elements. For this reason, the display described herein relies only on a passive display screen.

All active electro-optical elements are housed inside a set of specially designed projectors, each of which transmits its image, via the display screen, to only one eye of a single observer. In this way, N observers can view the same large screen, where N can be greater than one. Each of the 2N eyes (2 eyes per observer) can perceive a different and unique image. Each such "eye view" is not visible to the other 2N -1 eyes.

A single projector can also serve the function of multiple projectors, by time-multiplexing. In this variation, one projector sends K signals per moving image frame, in rapid sequence. During each sub-frame, that projector can accommodate K different observer eye positions. For example, if 60 images need to be displayed per second, and K=2, then one projector can accommodate two observer eye positions, by sending an image 120 times per second, alternating between the two targeted observers.

In this way, large-size custom stereoscopic viewing is supported for multiple simultaneous observers, upon a single passive display screen. This enabling mechanism also has other novel uses. For example, multiple observers can watch the same movie or interactive presentation simultaneously, with all figures and text labels customized in a way which is most appropriate for each observer, such as being translated into the language of that observer's choice, or showing sales figures, test scores, etc., appropriate to his or her situation. Also, a person giving a presentation can see his or her notes upon the screen, while those notes remain invisible to others in the room. Similarly, a presentation containing sensitive material can be given to different people who have different levels of security clearance, allowing only those persons who have the required level of permission to see certain privileged information in the presentation.

Also, the display allows a group of people to participate in remote teleconferences, so that participants at a remote location appear to participants within the room as though also present within the room. In this use, each eye of each participant within the room can see the remote participants from the correct viewpoint, as though each remote participant were at a consistent physical location within the room. Also, proper mutual eye contact can be maintained among all participants. Participants in the teleconference do not need to employ special eyewear.

SUMMARY OF THE INVENTION

The present invention pertains to an apparatus for showing images. The apparatus comprises a screen. The apparatus comprises means for displaying a distinct and separate image for each of a number of different observers simultaneously on the screen.

The present invention pertains to a method for showing images. The method comprises the steps of displaying a first image onto a passive screen oriented for a first eye of an observer to see. There is the step of displaying a second image separate and distinct from the first image onto the screen oriented for a second eye of the observer to see.

BRIEF DESCRIPTION OF THE DRAWINGS

In the accompanying drawings, the preferred embodiment of the invention and preferred methods of practicing the invention are illustrated in which.

DETAILED DESCRIPTION

Figure 22:
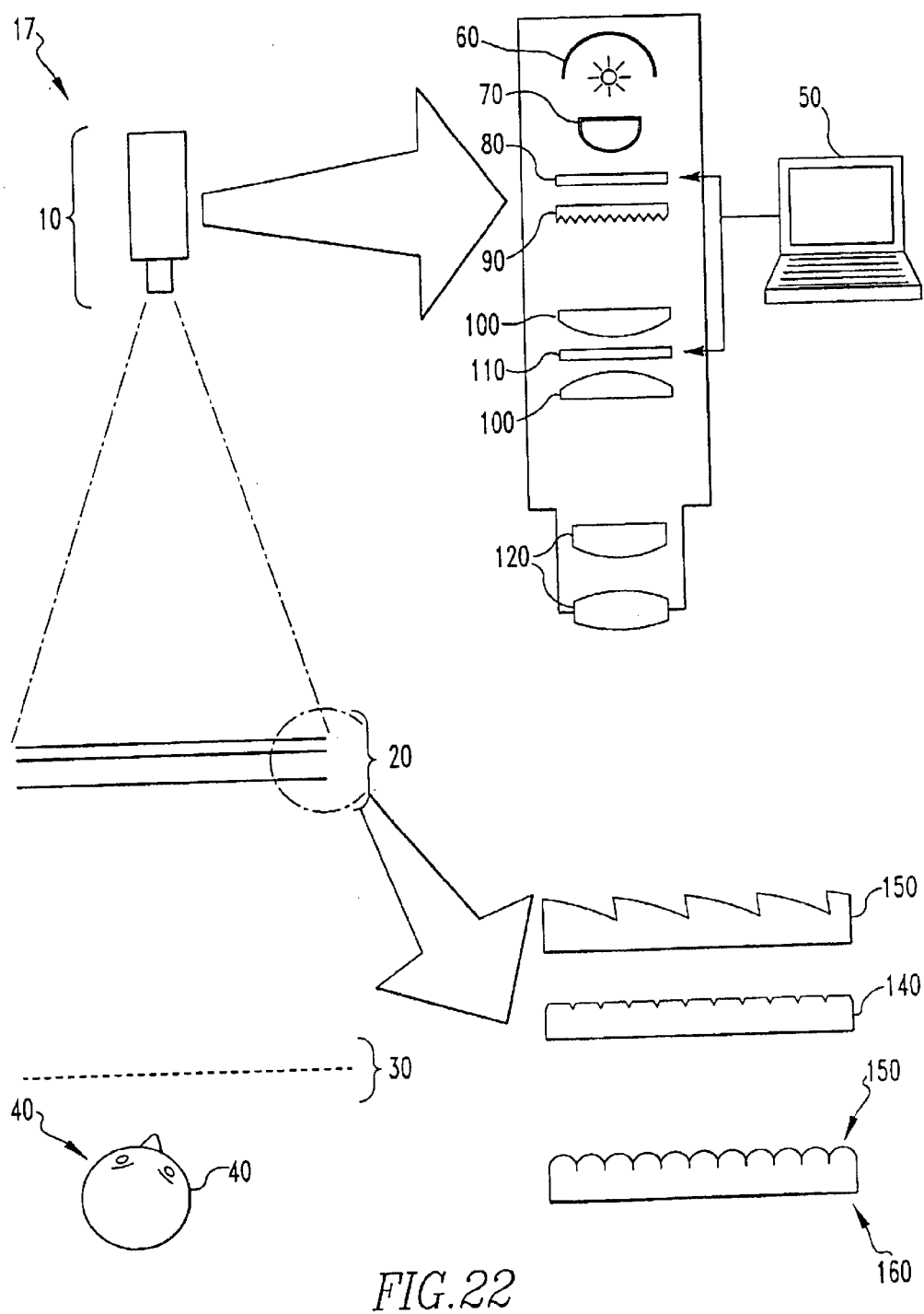
FIG. 22 is a schematic representation of the present invention.

Referring now to the drawings wherein like reference numerals refer to similar or identical parts throughout the several views, and more specifically to FIG. 22 thereof, there is shown an apparatus 170 for showing images. The apparatus 170 comprises a screen. The apparatus 170 comprises means for displaying a distinct and separate image for each of a number of different observers 40 simultaneously on the screen.

Preferably, the displaying means 180 displays a distinct and separate image independently for each eye of the number of different observers 40 simultaneously on the screen, so that each observer 40 can see an image stereoscopically. The screen preferably is a passive display screen 20. Preferably, the screen has no moving parts.

The displaying means 180 preferably includes at least one projector 10. Preferably, the displaying means 180 includes a virtual slit image 30 disposed between the projector 10 and the observers 40. The projector 10 preferably has no moving parts. Preferably, the displaying means 180 includes a plurality of projectors 10, with each projector 10 corresponding to each eye of an observer 40. The displaying means 180 preferably displays on the screen a separate and distinct image for each eye of the observers 40, where each of the observers 40 are at varying distances away from the screen and at varying distances left-to-right with respect to the screen.

Preferably, the screen includes a Fresnal screen layer which receives the image from the displaying means 180 and a nodal lenslet layer that is adjacent the Fresnal screen layer. The screen preferably includes a horizontal router layer 150 that is adjacent the nodal lenslets layer 140, and a vertical diffusion layer 160 adjacent the horizontal router layer 150.

Preferably, the projector 10 comprises a lamp and a condenser adjacent a lamp. The projector 10 preferably comprises an illuminator image 80 adjacent the condenser 70, illuminator image condensers 90 adjacent the illuminator image 80, relay lenses 100 adjacent to the illuminator image condensers 90, a spatial light modulator 110 disposed between the illuminator image condensers 90, and a computer 50 in communication with and in control of the illuminator image 80 and a spatial light modulator 110. Preferably, the projector 10 includes lenses adjacent the relay lenses 100 and spatial light modulator 110. The spatial light modulator 110 is preferably differently attenuated according to computer-modulated time-varying instructions from the computer 50 so as to form a sequence of images over time. Preferably, the illuminator image 80 is partitioned by the computer 50 into illuminator tiles where each illuminator tile maps into a corresponding region on the screen. The displaying means 180 preferably forms a four dimensional lightfield which the screen converts to a three-dimensional lightfield.

The present invention pertains to a method for showing images. The method comprises the steps of displaying a first image onto a passive screen oriented for a first eye of an observer 40 to see. There is the step of displaying a second image separate and distinct from the first image onto the screen oriented for a second eye of the observer 40 to see.

Preferably, there are the steps of displaying a third image separate and distinct from the first and second images onto the screen oriented for a first eye of another observer 40 to see; and displaying a fourth image separate and distinct from the first, second and third images onto the screen oriented for a second eye of another observer 40 to see. The displaying a first image step preferably includes the steps of forming a four dimensional lightfield in regard to the image with a projector 10, and converting the four dimensional lightfield to a three dimensional lightfield with the screen.

In the operation of the invention, an apparatus 170 for displaying, otherwise called an SLF display, is comprised of the following parts.

10 Projector
20 Display Screen
30 Virtual Slit Image
40 Observer
50 Computer
60 Projector Lamp
70 Projector Condenser
80 Projector Illuminator Image
90 Projector Illuminator Image Condenser
100 Projector Relay Lenses
110 Projector Spatial Light Modulator
120 Projector Lens
130 Display Screen Fresnel Lens Layer
140 Display Screen Nodal Lenslets Layer
150 Display Screen Horizontal Router Layer
160 Display Screen Vertical Diffusion Layer
170 Apparatus
180 Displaying Means The SLF display employs a specially designed passive projection screen which, at each image pixel, converts slight bidirectional (both horizontal and vertical) angular variation of collimated incoming light into large horizontal angular variation of outgoing light, while also vertically scattering the outgoing light.

Figure 1:
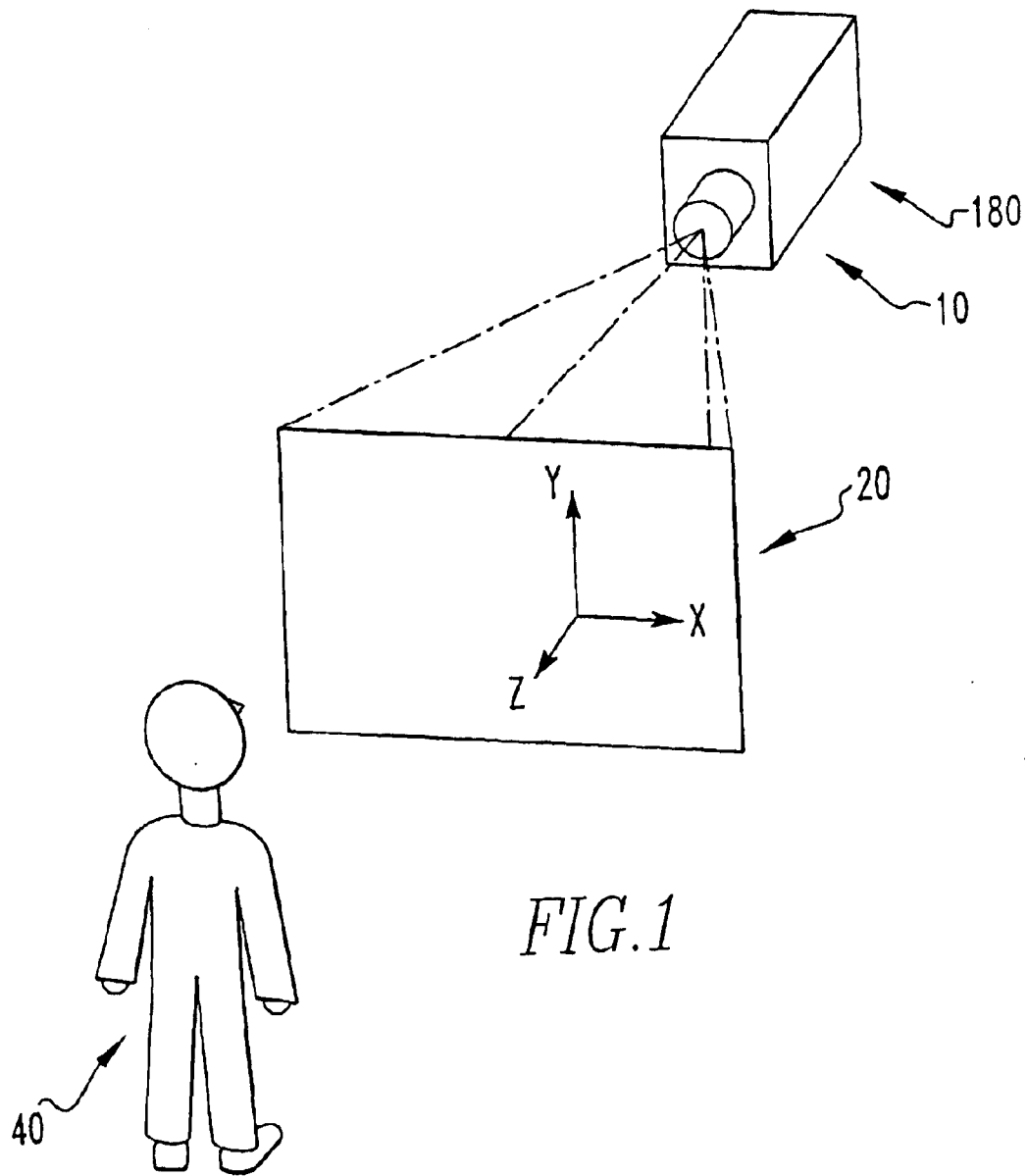
FIG. 1 is a perspective representation of a coordinate system used in regard to the present invention.

In the following discussion, x denotes the horizontal dimension across the screen, y denotes the vertical dimension, and z denotes the distance perpendicularly forward from the display screen 20 surface (FIG. 1).

Figure 2:
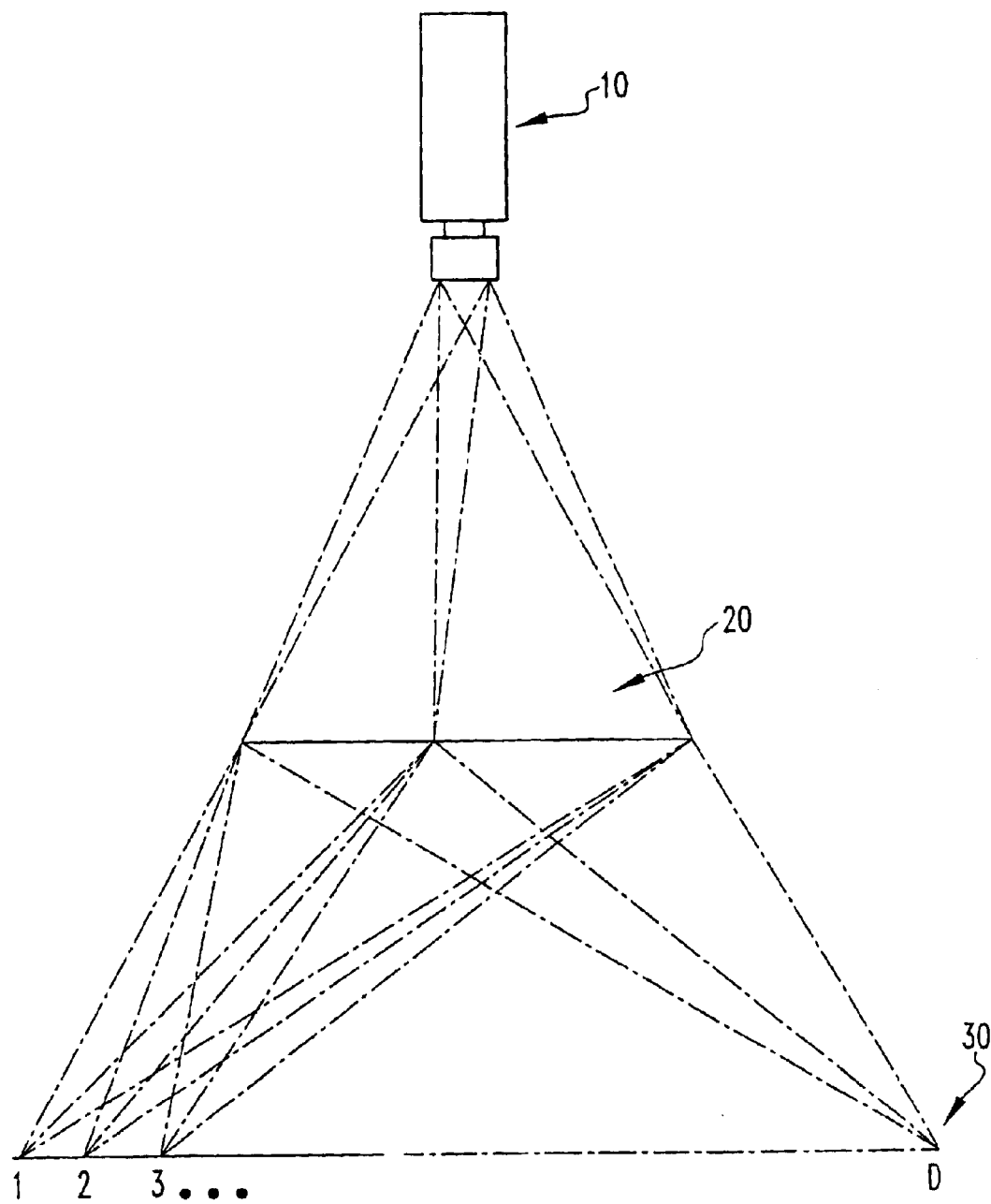
FIG. 2 is a representation of a virtual slit image in regard to the present invention.

Light that emerges from each pixel on the display screen 20 surface is aimed toward any one of D vertical slits of a "virtual slit image 30" that floats some fixed distance $V_z$ in space in front of the display screen 20 (FIG. 2). This virtual slit image 30 is not an actual physical structure, but rather is a useful construct for describing the behavior of light as it flows from the projector 10, through the screen, to the observer 40. A typical value for D is 64. Each virtual slit d is located at $(d_x, V_z)$ in the X,Z (horizontal) plane. The display screen 20 therefore functions as a three dimensional lightfield with $res_x \times res_y \times D$ elements. We use the notation (x,y,d) to denote the outgoing light into horizontal direction d from the pixel at a given position (x,y) in the image, where d can be any integer from 1 through D.

In one typical embodiment, the display screen 20 is one meter wide by 0.75 meters high, the virtual slit image 30 is two meters wide by one meter high, the virtual slit image 30 floats at a distance of two meters in front of the screen, consisting of 64 side-by-side adjoining vertical virtual slits, and each virtual slit is 32 mm wide by one meter high. At each pixel of the image, outgoing light can be steered to one selected virtual slit.

Figure 3:
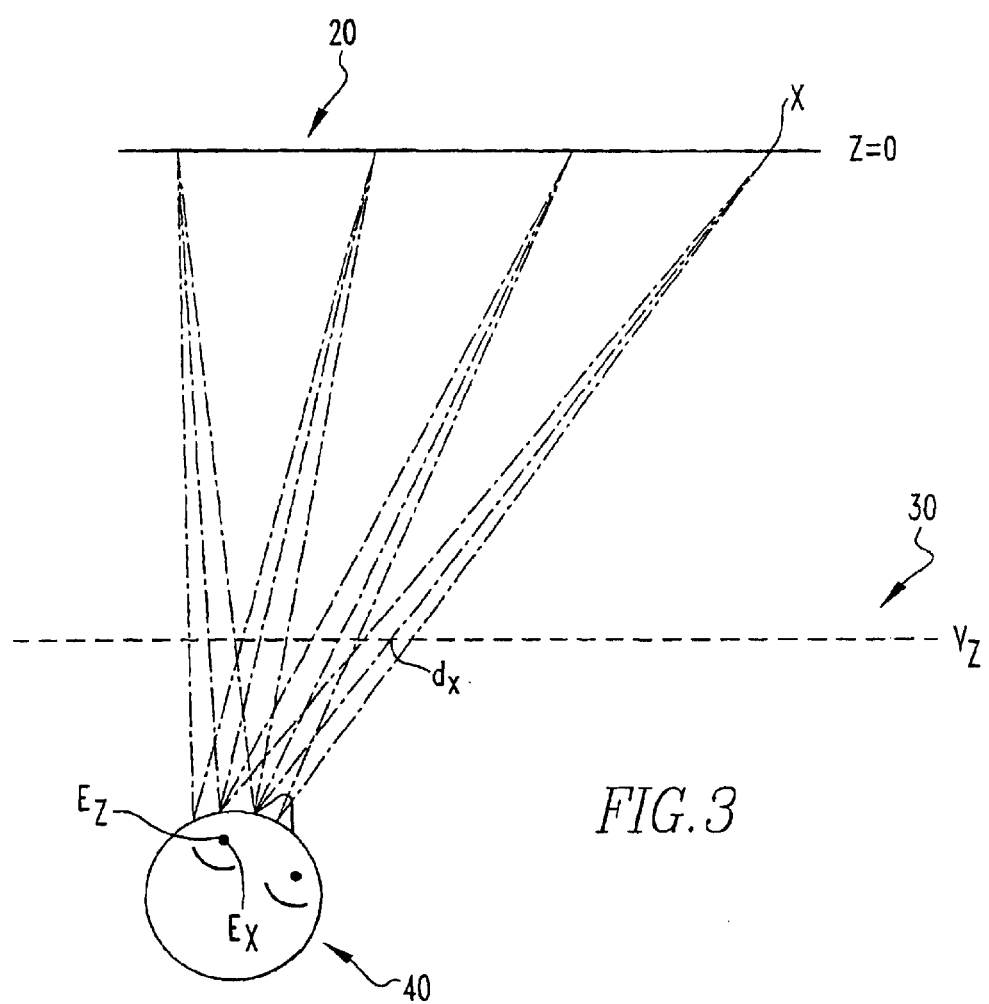
FIG. 3 is a representation of light from each pixel on a screen aimed toward an eye of an observer in regard to the present invention.

Given that an observer's 40 eye is at horizontal position $(E_x, E_z)$ in front of the display screen 20, the light from each pixel (x,y) on the screen is aimed toward the eye at $(E_x, E_z)$, by routing outgoing light toward whichever slit d satisfies the condition that the three points in the X,Z plane (x,0), $(d_x, V_z)$ and $(E_x, E_z)$ are collinear (FIG. 3).

Figure 4:
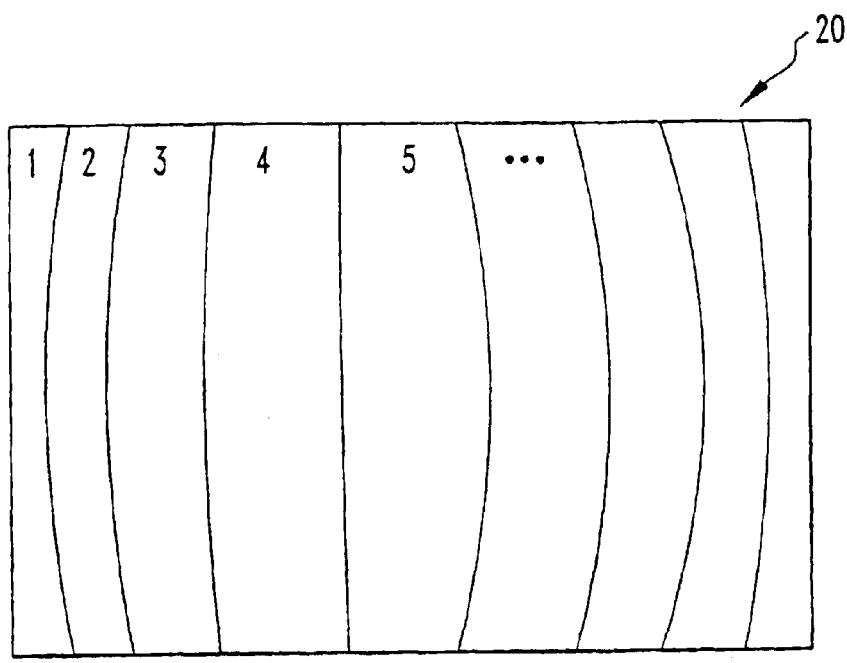
FIG. 4 is a representation showing the image divided into D distinct partitions.

Because each pixel on the display screen 20 routes light toward one of the D virtual slits, the image can be divided into D distinct partitions, where each partition consists of those pixels for which, after emerging from the display screen 20, light will be directed toward virtual slit d (FIG. 4).

A special projector 10 ensures that any ray of the projected light passes through one of D distinct regions upon the projection lens 120 surface, thereby effecting the required slight angular variation in light toward each pixel. This variation in position upon the projection lens 120 surface is implemented by a novel optical arrangement within the projector 10 mechanism, which will be described below.

Figure 5:
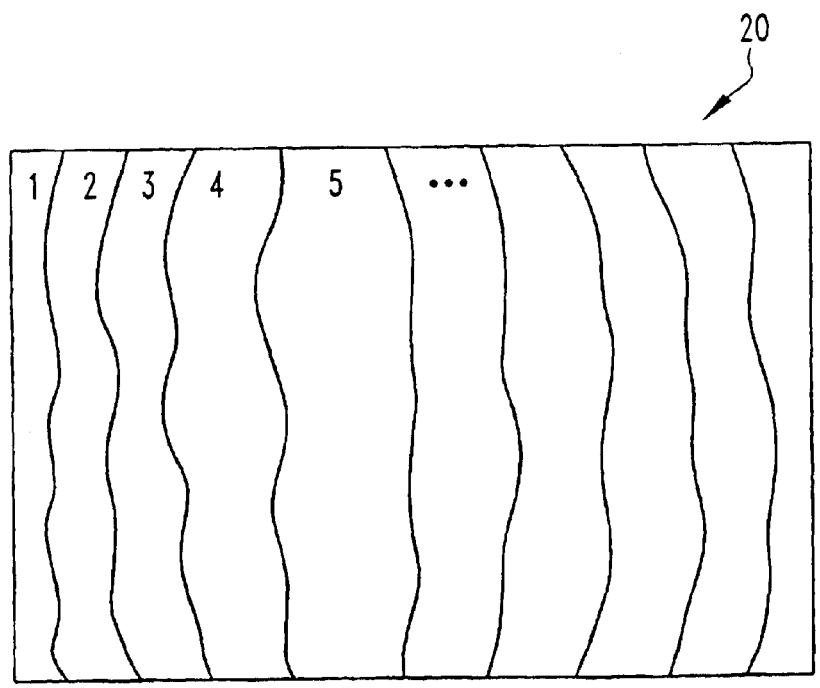
FIG. 5 is a representation of each partition that is somewhat wavy and curved in shape.

With perfect screen materials and projector 10 optics, each of the D image partitions would be in the shape of a vertical strip of the image. In practice, it is impossible to construct the projection optics and screen material so as to be perfect; the optimal result will require each partition to actually be somewhat wavy and curved in shape (FIG. 5). For this reason there needs to be a calibration measurement followed by a remapping in software of partition shapes, to account for spherical aberration and other optical projection defects, as well as for imperfections in the projection screen.

Figure 6:
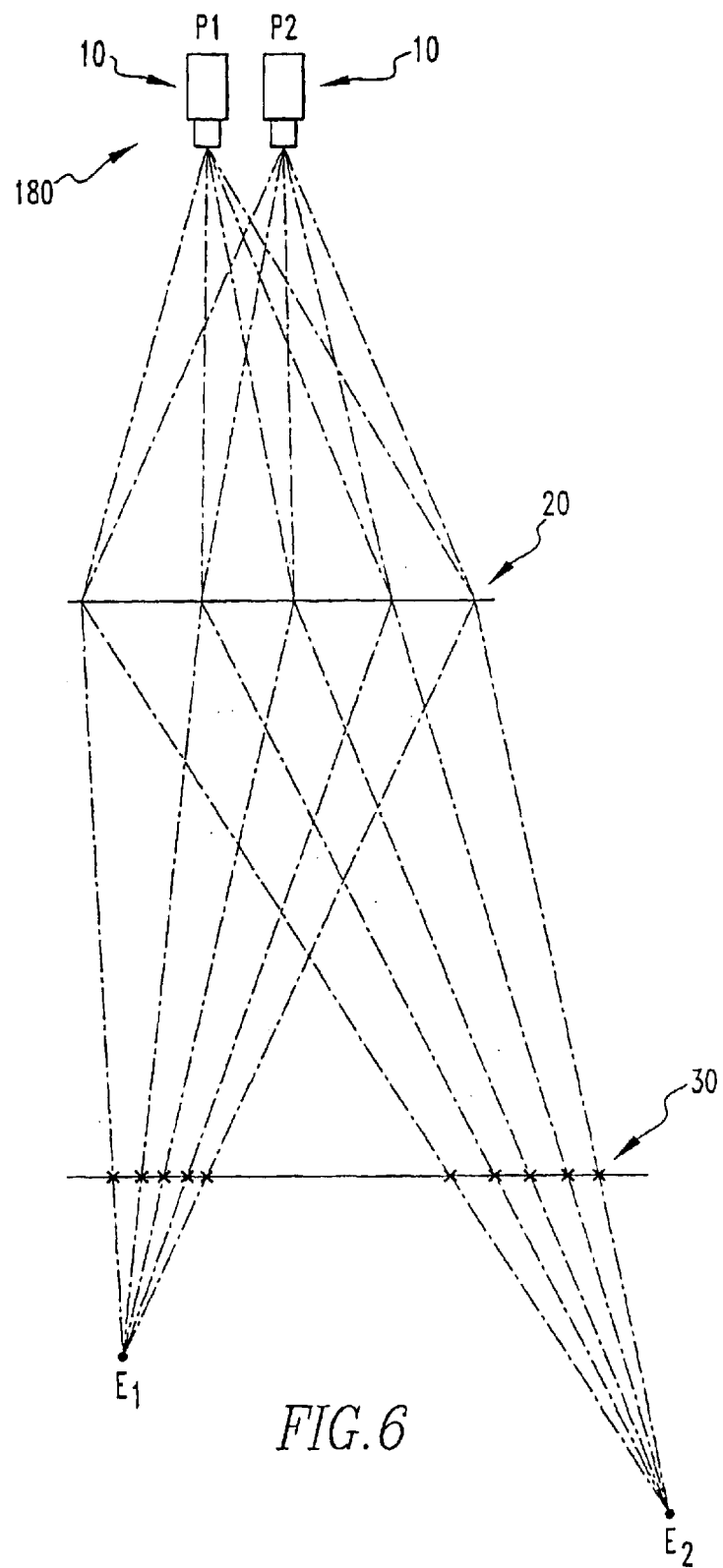
FIG. 6 is a representation of all light emerging from the display screen arriving only at one particular eye of the observer.

As any observer 40 moves around to different locations in the room in front of the display screen 20, any one projector 10 must send light to each pixel of the display screen 20 in such a way that the light which emerges from the display screen 20 arrives only at one particular eye of that observer 40, while not arriving at the observer's 40 other eye, nor to either eye of any of the other N−1 observers 40 (FIG. 6).

Figure 7A:
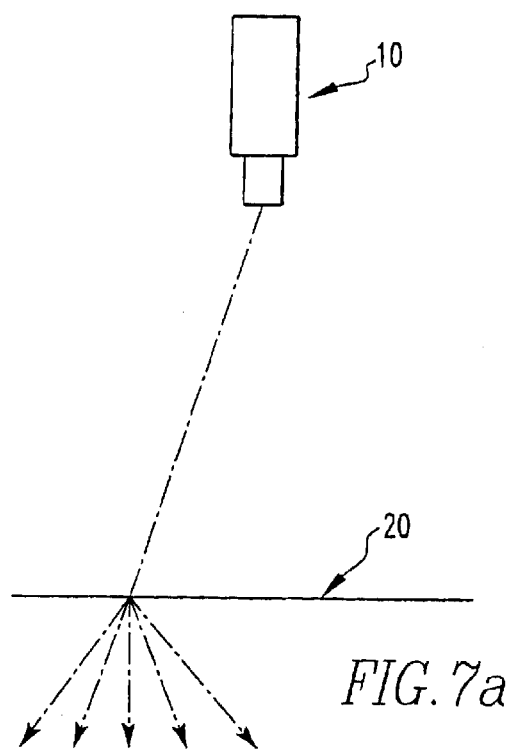
FIGS. 7a and 7b are overhead and perspective representations of a 3 dimensional lightfield at the display screen of the present invention.
Figure 7B:
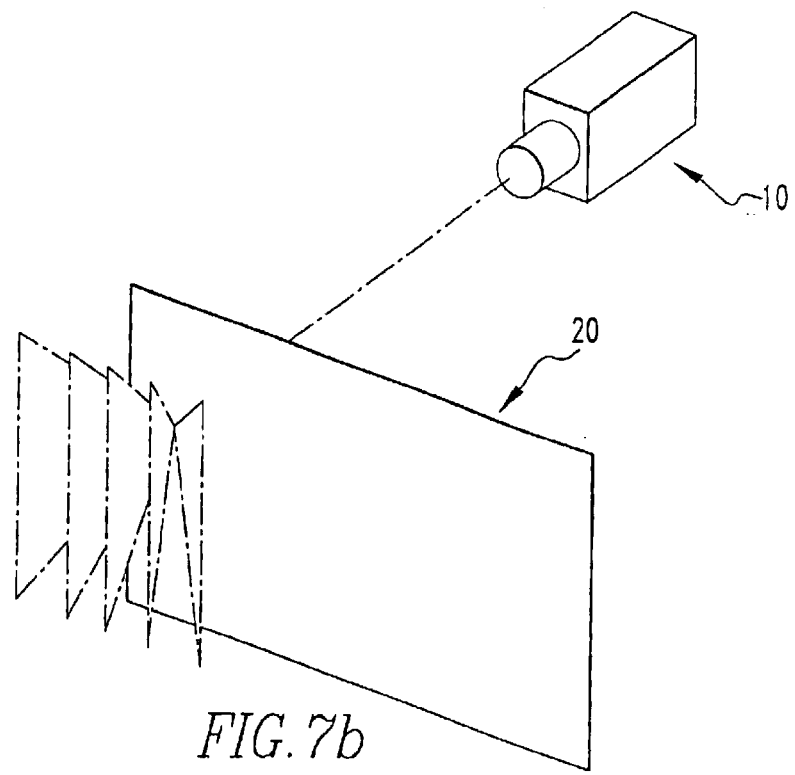

The assumption is made that observers 40 are not located vertically above one another in the room, but rather are generally in lateral positions with respect to one another: to the left or right of each other as they face the screen, and possibly at different distances away from the screen. Given this assumption, it is only necessary to carefully steer the horizontal direction of light which emerges from the display screen 20, not its vertical direction. In effect, a three dimensional lightfield is formed at the display screen 20 (FIGS. 7a and 7b).

Figure 8A:
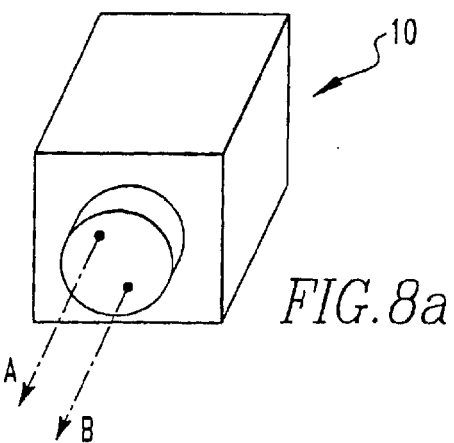
FIGS. 8a, 8b and 8c are representations of a 4 dimensional lightfield at the plane of the lens of the projector, which the passive display screen subsequently converts into a fine 3 dimensional lightfield.
Figure 8B:
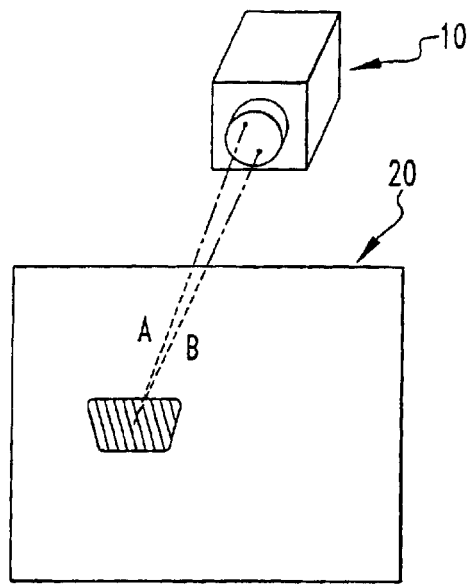
Figure 8C:
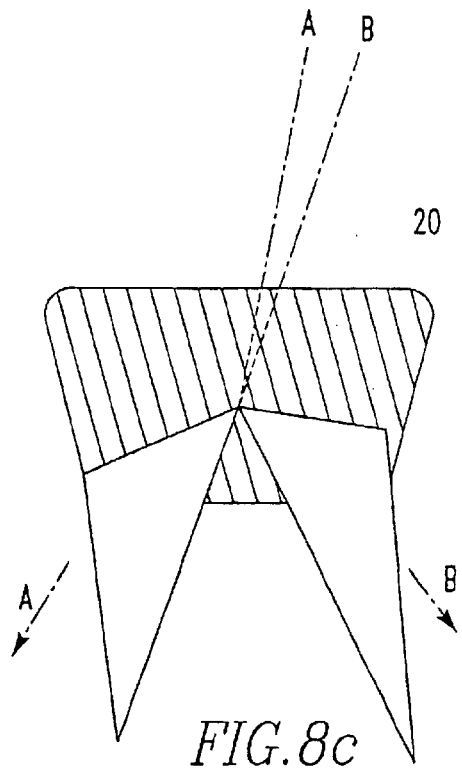

The projector 10 forms a coarse four dimensional lightfield at the plane of its projection lens 120, which the passive display screen 20 subsequently converts into a fine three dimensional lightfield. If, for example, an embodiment sends the light which emerges from each display screen 20 pixel into 64 different horizontal directions, then in that embodiment an 8×8 element lightfield may be formed at the projection lens 120. FIGS. 8a, 8b and 8c illustrate this principle. Pixels A' and B' of the display screen 20 each receive light from a different location A and B on the projector lens 120 surface. This information from where each of the beams of light originates on the projector lens 120 surface, is optically transformed by the passive display screen 20 into a particular horizontal deflection toward A" or B", respectively.

Figure 9A:
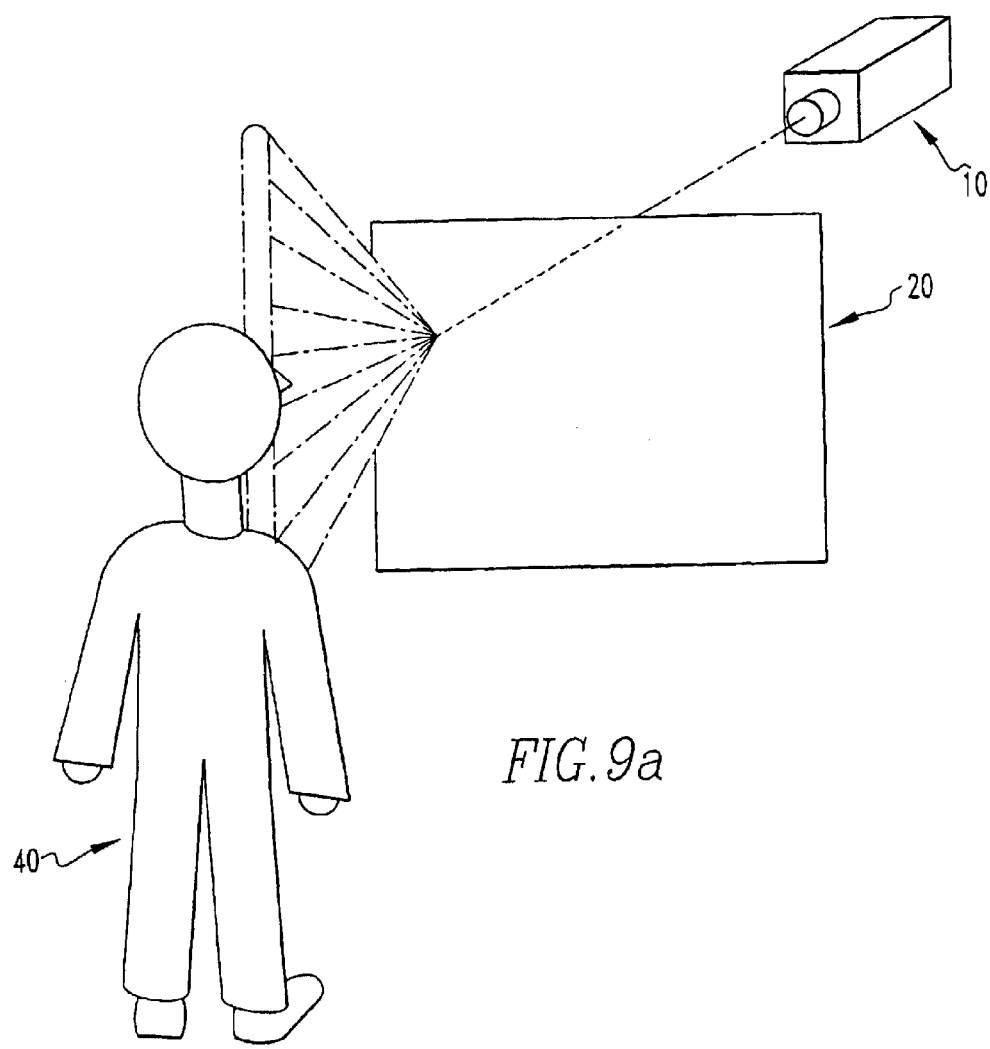
FIGS. 9a and 9b are representations of perspective and top views, respectively, of an observer standing in front of the display screen.
Figure 9B:
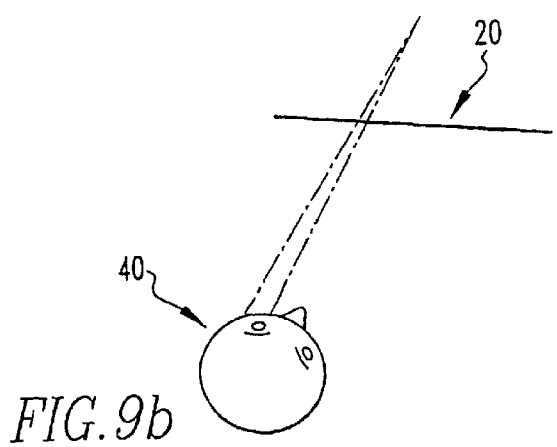

FIGS. 9a and 9b show perspective and top views of an observer 40 standing in front of the display screen 20. In FIGS. 9a and 9b, light from a projector 10 is shown traveling toward one pixel of the display screen 20. The display screen 20 is horizontally deflecting this light so that it arrives at the observer's 40 left eye, but not at the observer's 40 right eye.

Figures 10, 11:
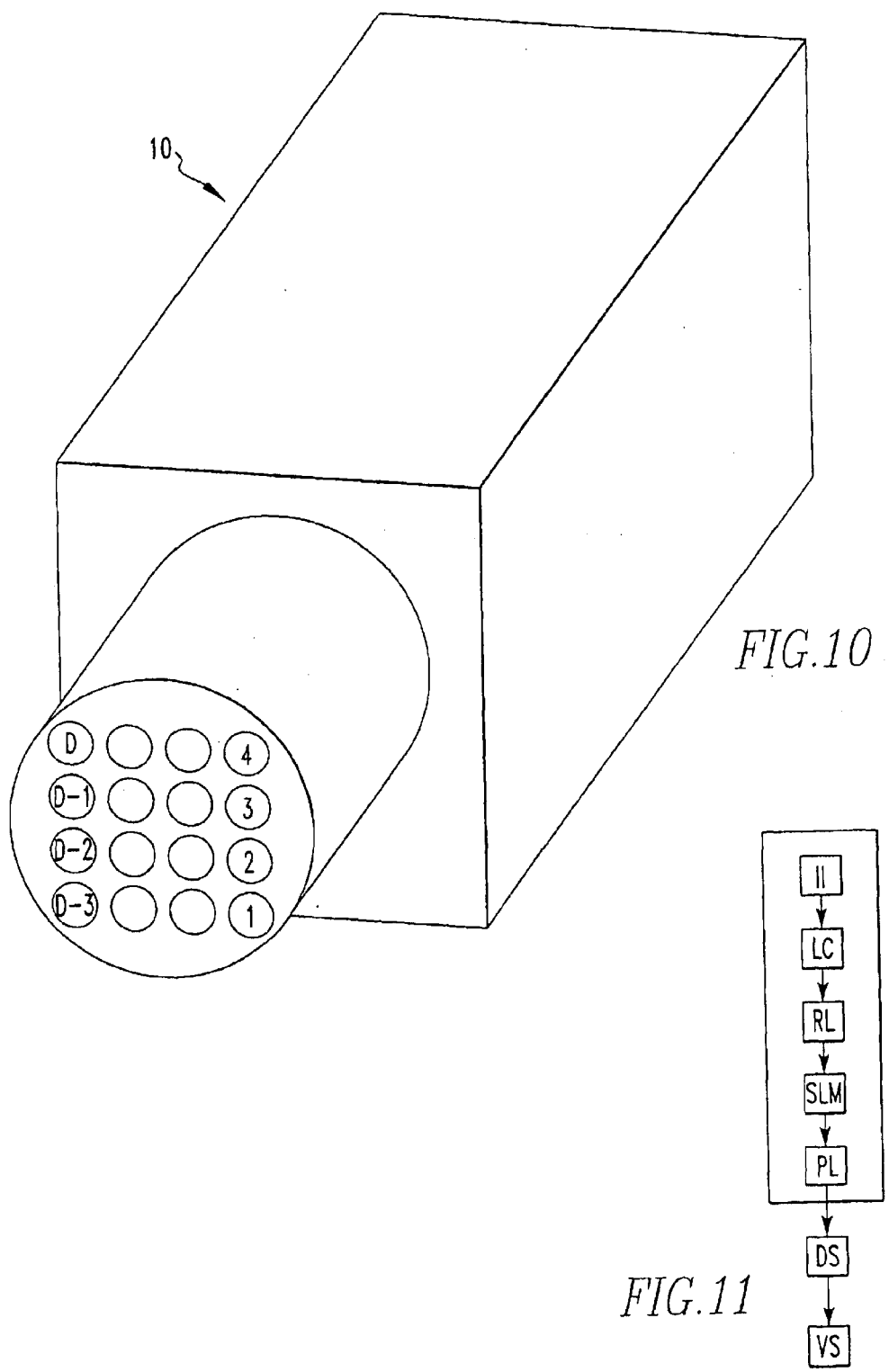
FIG. 10 is a representation of a slight variation in light direction achieved by light intended for slit d passing through a particular location Lsubd.
FIG. 11 shows the sequence that a ray of light goes through in regard to the present invention.

Each pixel in the final image needs to eventually be steered toward one virtual slit d. The projector 10 does this by projecting the light which needs to arrive at each slit d from a slightly different direction. The projector 10 effects this slight variation in light direction by passing all the light intended for slit d through a particular location $L_d$ on the projection lens 120 surface (FIG. 10).

It is the job of the projector 10 to divide the illumination of the projected image into D partitions, and then to ensure that each partition d travels through the correct location $L_d$ on the projection lens 120. This process is implemented as follows.

The Light Path

Any ray of light must go through the following sequence (FIG. 11):

Emerge from the illuminator image (II) 80;
pass through one of D light condensers (LC);
pass through a relay Lens (RL) 100 at the image plane, then immediately through the Spatial Light Modulator (SLM) 110;
pass through the projection lens (PL) 120;
pass through the passive display screen 20 (DS);
enter one of D virtual slits (VS).

The first five of these steps occur within the projector 10 itself. The last two steps occur after the light has exited from the projector 10.

Consider a ray of light that will strike the display screen 20 at (x,y) and then be deflected to virtual slit d. This is lightfield pixel (x,y,d). The path of this lightfield pixel from the II through the VS is now traced:

Emerge from the Illuminator Image (II) 80

Figure 12:
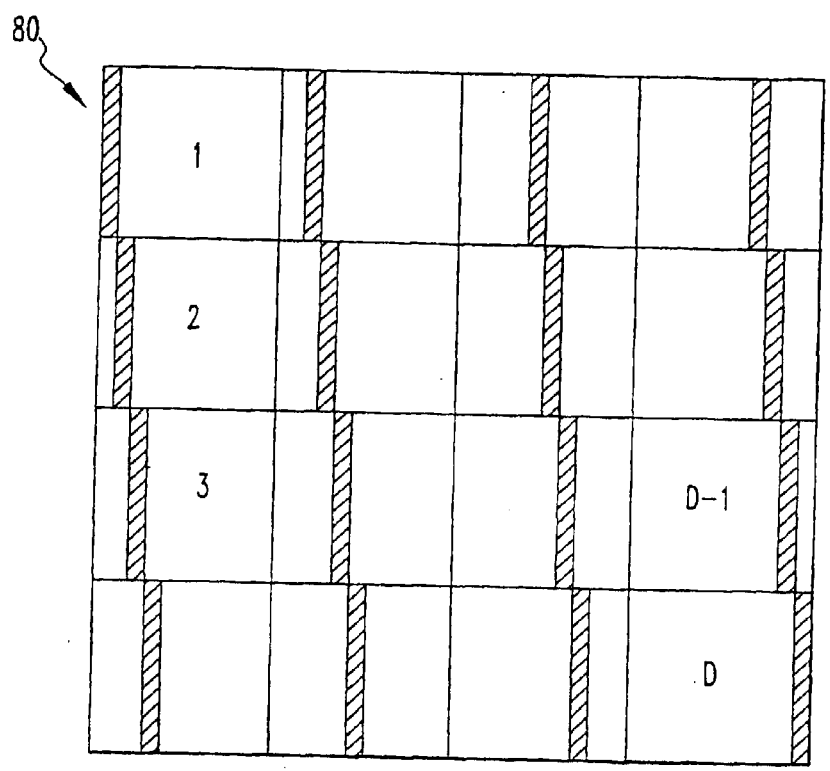
FIG. 12 is a representation of the illuminator image.

The illuminator image 80 is partitioned into D small low resolution "illuminator tiles". Each illuminator tile is numbered d=1 through D. Regions of each illuminator tile map one-to-one to corresponding regions on the final screen image. For example, the upper left corner of each illuminator tile maps onto the upper left corner of the final screen image. Each illuminator tile d is a coarse black-and-white image. Where the illuminator tile is white, this indicates that the corresponding image region will send its light to viewing slit d, thereby rendering that pixel viewable from viewing slit d. For those regions of the final image which should not be viewable from viewing slit d, the corresponding region of illuminator tile d is black. In FIG. 12, this has been shown in reverse color: the white areas represent unilluminated portions of the II, and the white areas represent illuminated portions of the II.

Figure 13:
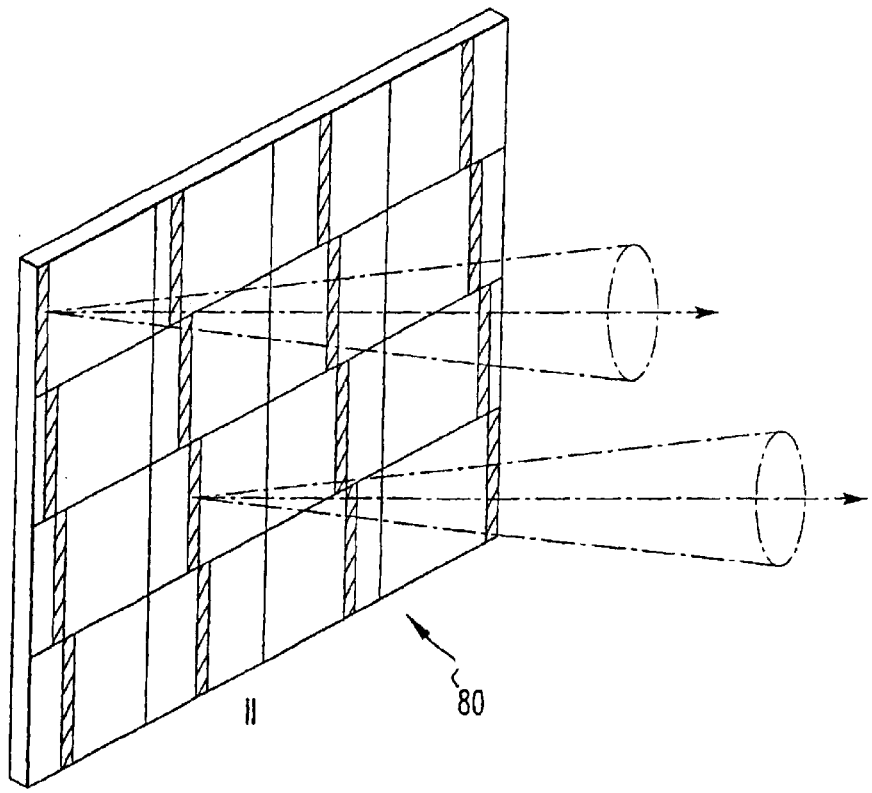
FIG. 13 is a representation of light emerging from a different location within each of two different illuminator tiles.

FIG. 13 shows light emerging from a different location within each of two different illuminator tiles. The choice of illuminator tile corresponds to a location on the projector lens 120. The location within each illuminator tile from which light emerges corresponds to a location on the final image.

Figure 14A:
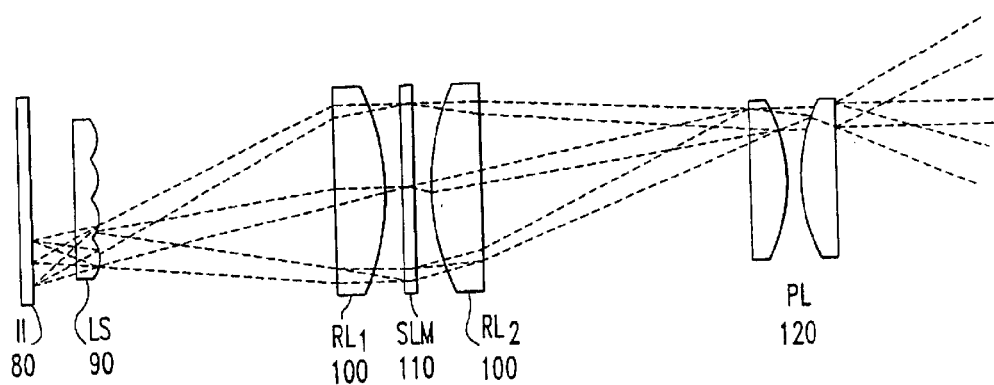
FIGS. 14a and 14b are side and perspective representations, respectively, of light emerging from one illuminator tile arriving at a small region of the projector lens.
Figure 14B:
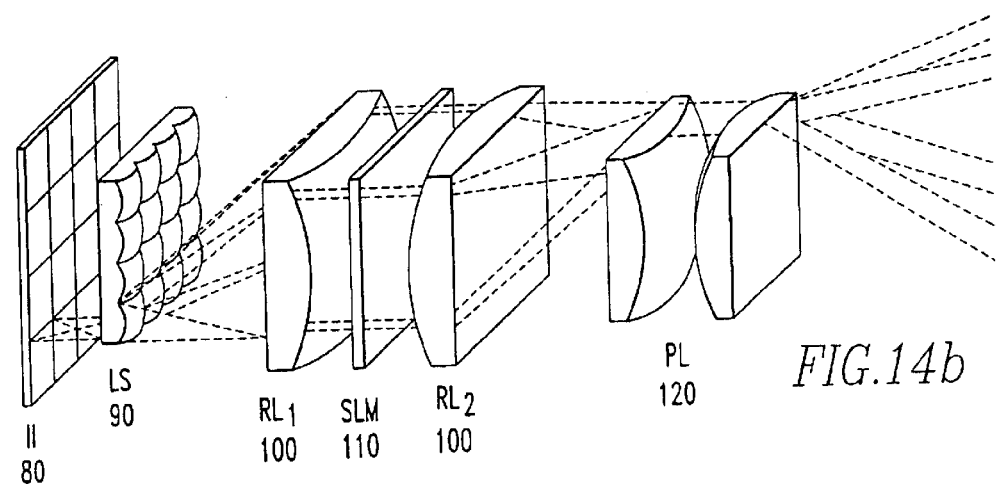

FIGS. 14a and 14b show that all the light emerging from one illuminator tile arrives at a small region of the projector lens 120. Each illuminator tile is mapped onto the entire final image, and represents one distinct horizontal direction into which light will emerge from the display screen 20. Those areas in each tile which are bright represent those areas of the final image from which light will emerge from the display screen 20 into a particular horizontal direction.

Pass Through One of D Light Condensers (LC)

Figure 15:
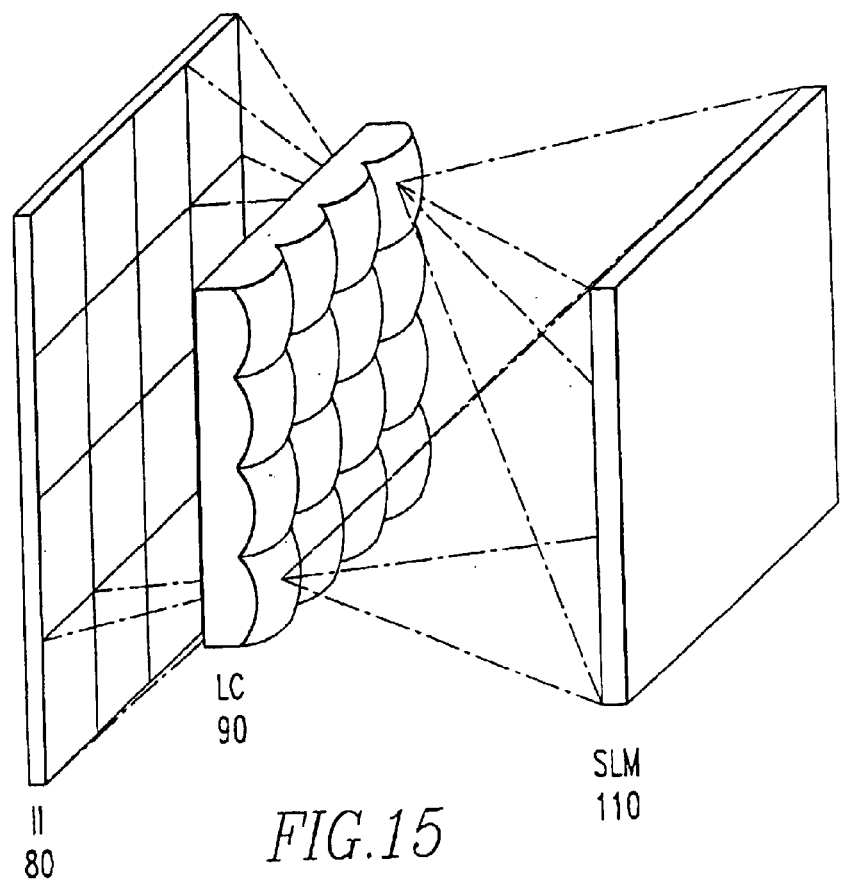
FIG. 15 is a representation of D light condensers organized into an array.

In front of each illuminator tile is a small lens, which acts as a light condenser. There are D such light condensers, organized into an array (FIG. 15). Light condenser d focuses the light from light tile d onto the imaging element of the projector 10. The light condensers are spaced more closely together than are the light tiles, so that the line between the center of each light tile d and the corresponding light condenser d intersects the center of the SLM. The effect of this arrangement is that the images on all of the light tiles will converge together at the plane of the SLM.

In this way, every pixel of the imaging element can be illuminated from any of d directions (one direction for each light tile).

Pass Through a Relay Lens (RL) at the Image Plane

Before impinging on the image modulator, light inside the projector 10 passes through a relay lens. The purpose of this lens is to refocus the light image later on, when it will reach the projector lens 120. The relay lens refocuses the image of each light condenser onto a corresponding, but optically inverted, location on the surface of the projection lens 120 (FIGS. 14a and 14b).

In FIGS. 14a and 14b, the relay lens has been implemented as a pair of plano-convex lenses, one before the SLM, and one after the SLM. This arrangement ensures that the plane of the SLM will be optically conjugate to the plane containing the array of light condensers.

Then Immediately Through the Spatial Light Modulator (SLM) 110

The spatial light modulator (SLM) 110, which can be a liquid crystal element, an array of micro-mechanical deflector elements, or other electro-optical switching array, acts according to standard practice: Incoming light at each pixel of the SLM is differentially attenuated, according to computer-modulated time-varying instructions, so as to form a sequence of images over time (FIG. 13 and FIGS. 14a and 14b).

Pass Through the Projection Lens (PL) 120

The projection lens (PL) 120 focuses the image from the SLM onto the display screen 20. All the light from any light tile d will pass through a distinct small region of the projection lens 120 surface on its way to the display screen 20 (FIGS. 14a and 14b).

In fact, an inverted image of each light condenser is located at a distinct position on the projection lens 120 surface, because the relay lens forms an inverted image of the array of light condensers onto the projection lens 120.

Pass Through the Passive Display Screen 20 (DS)

The display screen 20 consists of microstructured optics that convert slight differences in incoming light direction to large differences in outgoing horizontal light direction. The display screen 20 also scatters light in the vertical direction.

At each pixel on the display screen 20, depending upon which from position d on the projection lens 120 surface light is arriving, the light at that pixel is sent out into the room toward one of the D virtual slits.

Figure 16A:
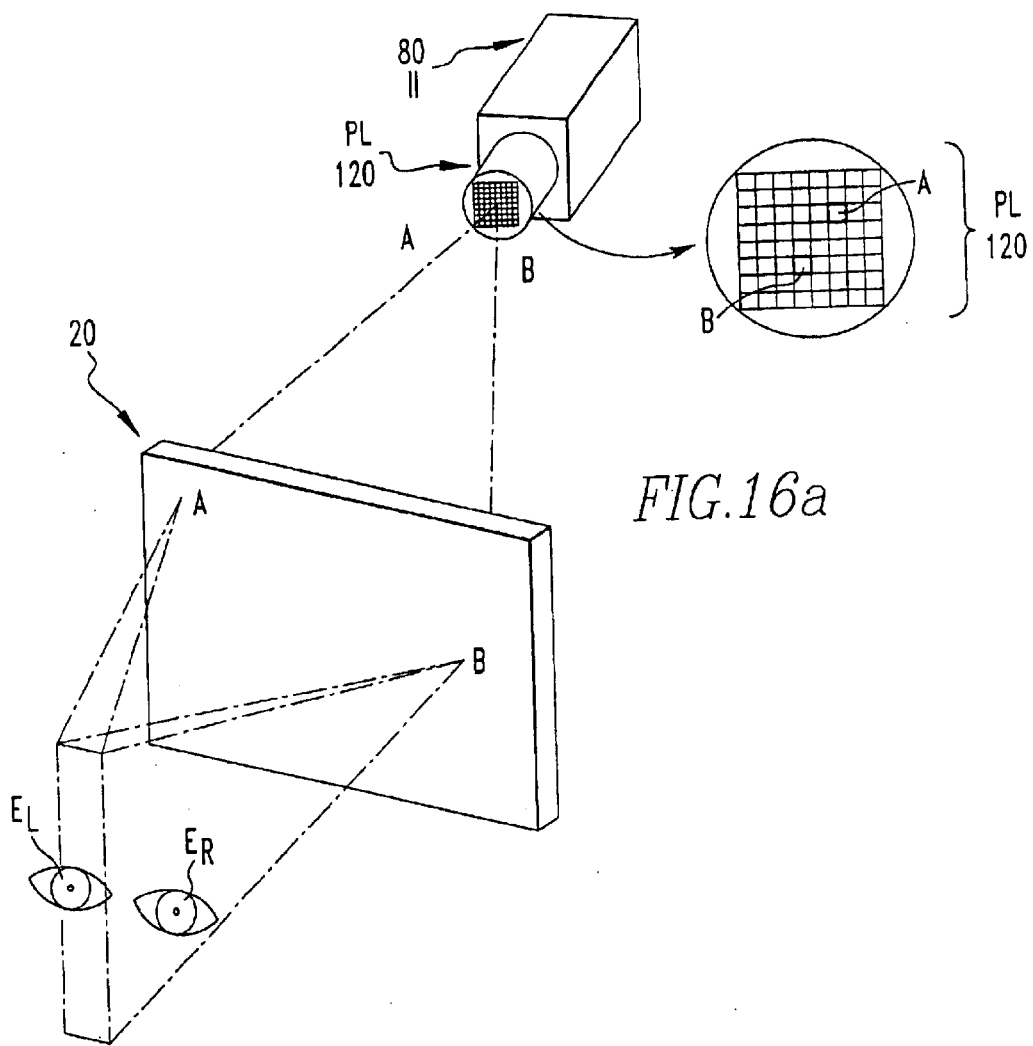
FIGS. 16a, 16b and 16c are representations regarding 2 rays of light emerging from the projector, striking the passive display screen, and being deflected by the display screen toward the left eye of an observer, but not toward the right eye of the observer.
Figure 16B:
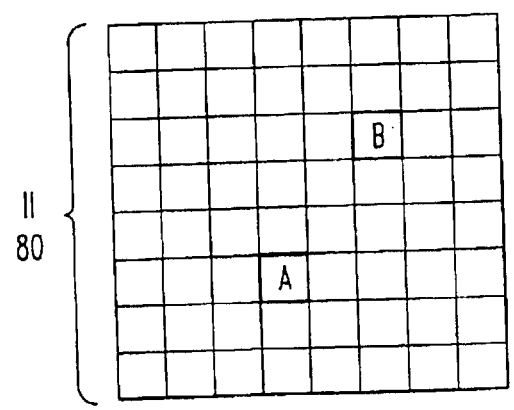
Figure 16C:
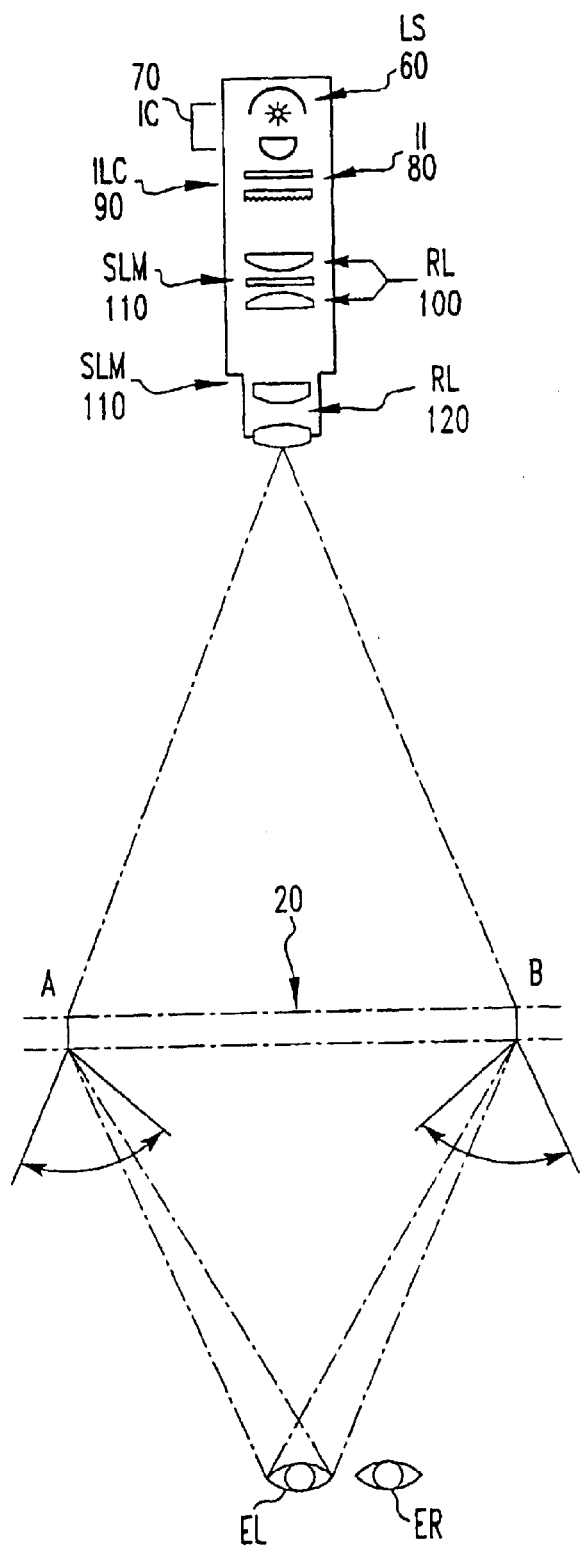

FIGS. 16a, 16b and 16c show, on the top left, two representative rays of light, A and B, emerging from the projector 10, striking the passive display screen 20, and being deflected by the display screen 20 toward the left eye of an observer 40, but not toward the right eye of that observer 40.

The bottom left of FIG. 16b shows the respective illumination source locations in the illumination image (II) of the light for beams A and B. The position of each ray's source location within the II defines that ray in two distinct ways:

The square containing each source location defines where that ray will intersect the projector lens 120, and therefore in what direction that ray will eventually emerge from the display screen 20.

The position of each source location within its respective square defines the ray's location within the image, and therefore where that ray will intersect the screen.

The upper right of FIG. 16a shows where rays A and B pass through the surface of the projector lens (PL) 120. Note that these locations are inverted with respect to the rays' respective locations within the II.

FIG. 16c shows the complete light path of the two rays A and B from the projection lamp source (LS) 60, through the lamp's condenser assembly (C), through the illumination image (II), through the light condensers (LC), through the spatial light modulator (SLM) 110, refocused by the relay lenses (RL) 100, onto the projector lens (PL) 120, passing through points A and B on the display screen 20, and finally into the observer's 40 left eye.

Enter One of D Virtual Slits (VS)

The display screen 20 can be either reflective (for front projection) or transmissive (for rear projection). A rear projection version is implemented as follows.

The projector 10 is placed behind the display screen 20, and observers 40 stand in front of the display screen 20. The display screen 20 itself consists of a tiling of elements. In one typical embodiment, each element is a square one millimeter wide. In that embodiment, a display screen 20 one meter wide by 750 mm high would contain 1000×750 elements.

Each element in the display screen 20 consists of two successive depth layers, ordered from back to front:

Nodal lenslets (NL)

Horizontal router (HR)

The distance from the NL layer (1) to the HR layer (2) must conform to the ratio:

$$\frac{\text{projector distance to display screen}}{\text{projector lens width}} = \frac{\text{distance from layer (1) to layer (2)}}{\text{element width}}$$

In a typical embodiment, the projector lens 120 is 32 mm wide, the distance from the projector 10 to the display screen 20 is two meters, each screen element is a one millimeter square. In that embodiment, since a nodal lenslet (NL) from layer (1) must focus an image of the project lens onto the horizontal router (HR) layer (2), the distance from layer (1) to layer (2) must be 1 mm×(2000 mm/32 mm)=64 mm.

Light from the projector lens 120 first enters a NL, which forms an image of the projector lens 120 onto the HR layer. Depending upon the angle of incidence of the light from the projector 10, this light can then enter various adjoining places in the HR.

Figure 17A:
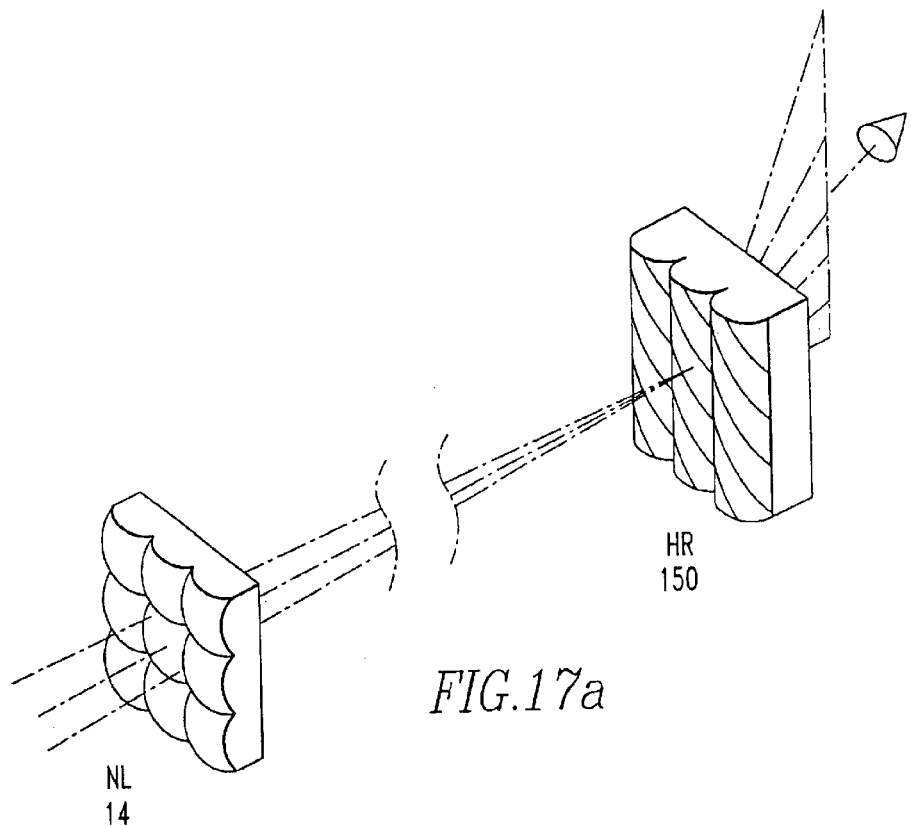
FIGS. 17a and 17b are representations showing light from any position on the projector lens will be imaged by 1 N L onto one position within the HR layer.
Figure 17B:
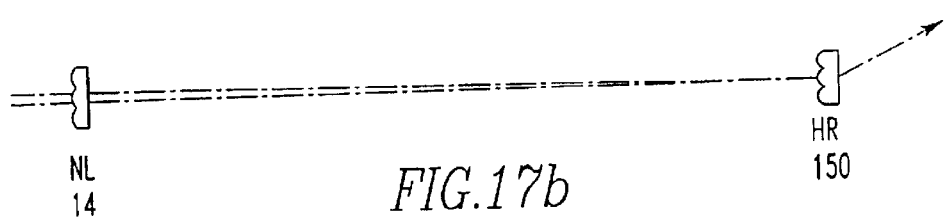

Light from any position (u, v) on the projector lens 120 will be imaged by one NL onto one position within the HR layer (FIGS. 17a and 17b).

The HR consists of a repeating tiling pattern. In a typical embodiment this pattern forms an approximately square Q×Q structure, where Q is a positive integer. Each location on the HR surface deflects incoming light into a different horizontal direction. To create a total of D virtual slits in the resulting lightfield, Q is chosen so that $Q^2=D$. In a typical embodiment, Q=8, to create D=64 virtual slits.

Light which exits the HR layer is subsequently vertically diffused, so that an observer 40 from a large range of vertical angles can see the emerging light.

The light proceeding from the NL layer (1) to the HR layer (2) forms a very narrow beam, and therefore it is important to consider the diffraction limit of light. When nearly parallel light travels through the narrow aperture of a small lens of long focal length, the wave nature of light imposes a limit upon attainable resolution. For this reason, it is important to determine the finest resolvable detail in the image of the projection lens 120 that can be formed by the small, long focal length, lenslets of the NL layer (1) onto the HR layer (2).

The diffraction limit of a lens imaging system describes the minimum resolvable distance between successive bright spots within a focused image. The diffraction limit of a simple lens system is given by:

$$\theta = 1.22 \times \text{wavelength}/\text{diffraction\_limit}$$

In a typical embodiment, the projection lens 120 is a square aperture 32 mm wide, at a distance of 2000 mm. The angle subtended by its image will therefore be approximately (32 mm/2000 mm)=1/64 radian. The worst case, for which the smallest resolvable spot will be largest, is red light, whose 0.65 micron wavelength is the largest wavelength within the visible light spectrum. The numerator on the right side of the above equation will then be 1.22×0.65 micron, or approximately 0.8 microns. The smallest distance S between successive resolvable spots at the HR layer is therefore given by:

$$1/64 = 0.0008 \text{ mm}/S \quad S = 0.0008 \times 64 = 0.05 \text{ mm}$$

In one embodiment, in which each display screen 20 element is 1 mm wide, and in which the nodal image of the square projector lens 120 aperture consists of 64 zones (a square array of 8×8 bright spots), then the distance between successive spots is 1 mm/8, or 0.125 mm. This is greater than the diffraction limit of 0.05 mm by more than a factor of two, thereby ensuring that performance will not be significantly degraded by diffraction limitations.

In particular, given a square projector lens 120 aperture 32 mm in width, at a distance of 2 meters from the display screen 20, a display screen 20 element structure that generates 64 zones can comfortably accommodate an element width as small as 0.5 mm (or about 50 elements per inch), since this produces a separation between successive resolved spots of 0.0625 mm, which is still larger than the 0.05 mm diffraction limit for the worst case (red light). Practically speaking, this means that the discrete "grain" structure of the display screen 20 can accommodate a linear resolution of at least 2000 pixels per linear meter of display screen 20 width.

A key attribute of the method of the Steerable Lightfield Projection display is the use of a two dimensional nodal image within the projector 10 and within the microstructure of the display screen 20, to effect the one dimensional selectability of final horizontal exit angle of light emerging from pixels of the display screen 20. To understand why this is an essential feature of the method, it is useful to consider, by way of contrast, an alternate method which would form only a one dimensional, horizontal, nodal image structure at the nodal plane of the projection lens 120.

Such an alternate method is described in the Appendix, where it is demonstrated that a similar approach which used only a one dimensional nodal image would produce unacceptably low resolution, due to diffraction limitations.

The nodal image at the projection lens 120 will be projected by each nodal lenslet of the NL layer (1) from a different angle, and will therefore form its reduced image of the nodal image at a position within the HR layer (2) which is not necessarily aligned with any particular HR boundary. In general, there will be an arbitrary positional shift (u,v) of the image of the projector lens 120 within the HR layer.

Figure 18:
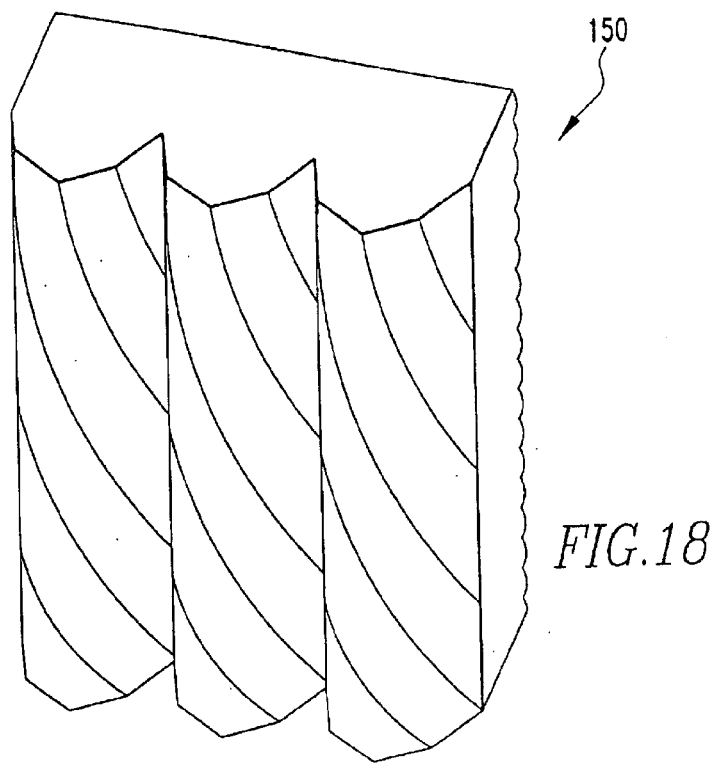
FIG. 18 is a representation of the HR in layer 2.

In practice, this does not pose any difficulty. The HR in layer (2) consists of a repeating tiling pattern (FIG. 18). If the computer 50 software that assigns different display screen 20 regions to different virtual slits is given correct information as to the positional shift within this pattern at any region of the display screen 20, then it can perform a corresponding toroidal rotation (ie: a positional shift modulus one) in both u and v, so that the proper spot is projected onto the correct sub-position of this tiling pattern within the HR.

Figure 19A:
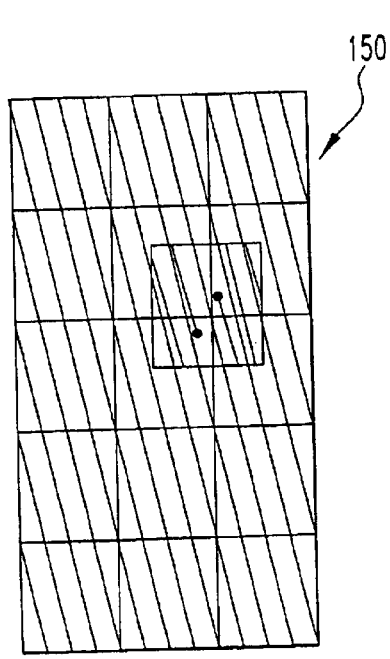
FIGS. 19a and 19b are representations of two situations, side by side of a small inverted image of the projector lens being focused onto the HR by one nodal lenslet.
Figure 19B:
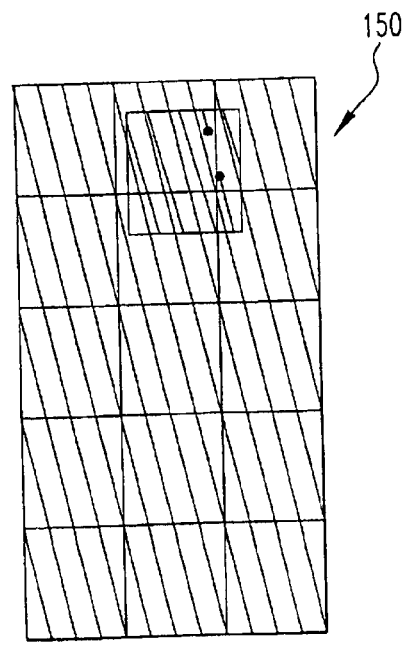

FIGS. 19a and 19b show two situations, side by side. In each situation, a small inverted image of the projection lens 120 has been focused onto the HR by one nodal lenslet. The difference between the left and right images lies in where, within the HR's repeating structure, this image impinges upon the HR. A slanting path terminated by dots has been drawn within each square, to illustrate, in each case, a path within the HR over which refraction varies continuously from being maximally to the left toward being maximally to the right. In fact, for any position at which the square image of the projection lens 120 impinges upon the HR, it is possible to draw a path that contains all horizontal refractions of which the HR is capable.

The correct information as to the sub-element positional shift at each region of the display screen 20 is obtained by doing an optical calibration measurement, in which light is projected onto the entire screen from each of the Q×Q nodal zones. Well-calibrated digital cameras are employed to measure the resulting image from different points in space, thereby effecting a mapping from input zone to output zone from each location on the display screen 20.

Given any square region, one millimeter wide, on the display screen 20 surface, it is useful to imagine a Q×Q grid structure superimposed upon the square, which divides the square into $Q^2$ subsquares. Light entering the square must be refracted by the screen surface so as to be directed out to one of $Q^2$ distinct outgoing horizontal directions, dependent upon which of these $Q^2$ subsquares the incoming light has entered. The micro-relief structure shown in FIG. 18 will effect this property. This structure consists of a set of vertical lenticular structures, each of which, as shown in FIG. 18, is comprised of a repeating pattern of helical ribbons.

The effect of this arrangement is that within any one millimeter square of the display surface there is a locally flat region containing any horizontal surface normal tilt, from extreme left to extreme right.

In order to avoid diffraction effects at the discontinuous boundaries between strips, the surface at the left and right edges of each vertical strip of this structure can be darkened to opaque black.

This micro-relief structure can be effected by any of the known methods for creating a micro-relief structure. One of these methods is to create a negative master from a photo-etching process, and then use this master to stamp or to press a repeating pattern of the micro-relief structure onto a plastic screen.

It is useful to precisely position the Q×Q spots that are imaged by the projector 10 onto layer (2), to account for small variations in projected spot position due to small variations in element position and thickness that vary gradually across the area of the display screen 20. For this reason, it is useful to form a higher resolution nodal image at the projection lens 120, and then sub-sample this higher resolution nodal image down to Q×Q spots.

Figure 20A:
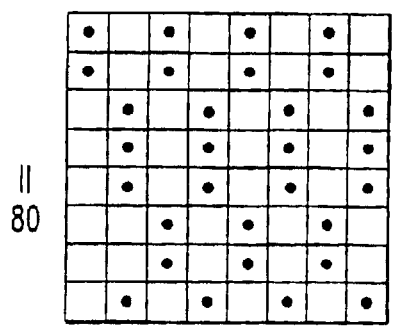
FIGS. 20a and 20b are representations of one embodiment of a nodal image consisting of a square array of 2 Q x x 2 Q spots.
Figure 20B:
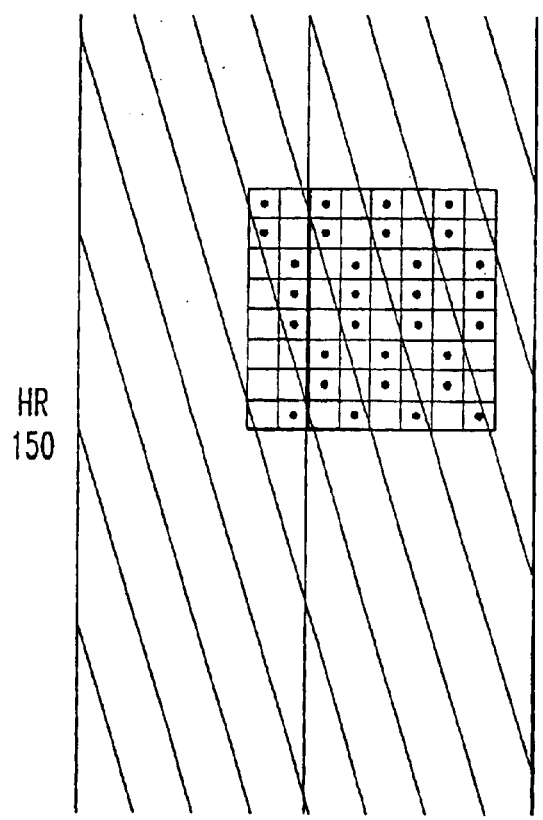

In one embodiment, this higher resolution nodal image consists of a square array of 2Q×2Q spots (FIGS. 20a and 20b). This higher resolution nodal image can then be resampled in software, after doing an optical measurement of the small variations in projected spot position, This accounts for the measured variations in pattern position at the various regions of the display screen 20, to form a precisely aligned Q×Q spot image at each element of the display screen 20.

Creation of a higher resolution nodal image requires that there be 2Q×2Q light condensers (LC) in the projector 10, each of which is dedicated to one of 2Q×2Q illuminator tiles in the illuminator image (II) 80. If a 1024 pixel wide light modulator is used to form the II, and if Q=8, then each illuminator tile can be 1024/(2×8)=64 pixels across. This enables the lightfield to contain 64 distinct horizontal regions, across the width of the display screen 20. A supersampling for Q greater than 2 can also be used to enable a better sampling pattern within the HR microstructure of the display screen 20, at the cost of a concurrent loss of spatial resolution of the lightfield.

It is important not to reduce the spatial resolution of the lightfield too drastically, since it then becomes more difficult to accommodate observers 40 who are very near to the display screen 20. This is due to the fact that as an observer 40 moves nearer to the display screen 20, then light emerging from the display screen 20 must be sent to that observer 40 from a greater range of exit angles at different points across the width of the display screen 20. This larger number of exit angles requires correspondingly higher spatial resolution in the lightfield.

The nodal lenslet and HR optics will have different refractive properties at different points of the visible spectrum. For this reason, a separate calibration step can be done for red, green, and blue light. For each of these component spectral sub-bands, a different software adjustment is made to remap input zones to output zones, and to resample the 2Q×2Q spot nodal image so as to create an optimal Q×Q spot pattern for that spectral sub-band at each element of the display screen 20.

It is useful to place a large correcting lens, such as a fresnel lens 130, in front of the first layer of the screen. This will convert the outward-fanning light rays from the projector 10 into approximately parallel light rays. The proper power for this correcting lens depends upon the distance $P_z$ of the projector 10 away from the screen and the width W of the screen, and is given by $P_z/W$. For example, if the projector 10 is two meters behind the screen, then a two meter lens is required.

When such a correcting lens is used, then light which emerges toward the observer 40 from all points on the screen will fan out into the same range of angles. This makes it easier to maximize field of view for observers 40 in various positions.

Figure 21:
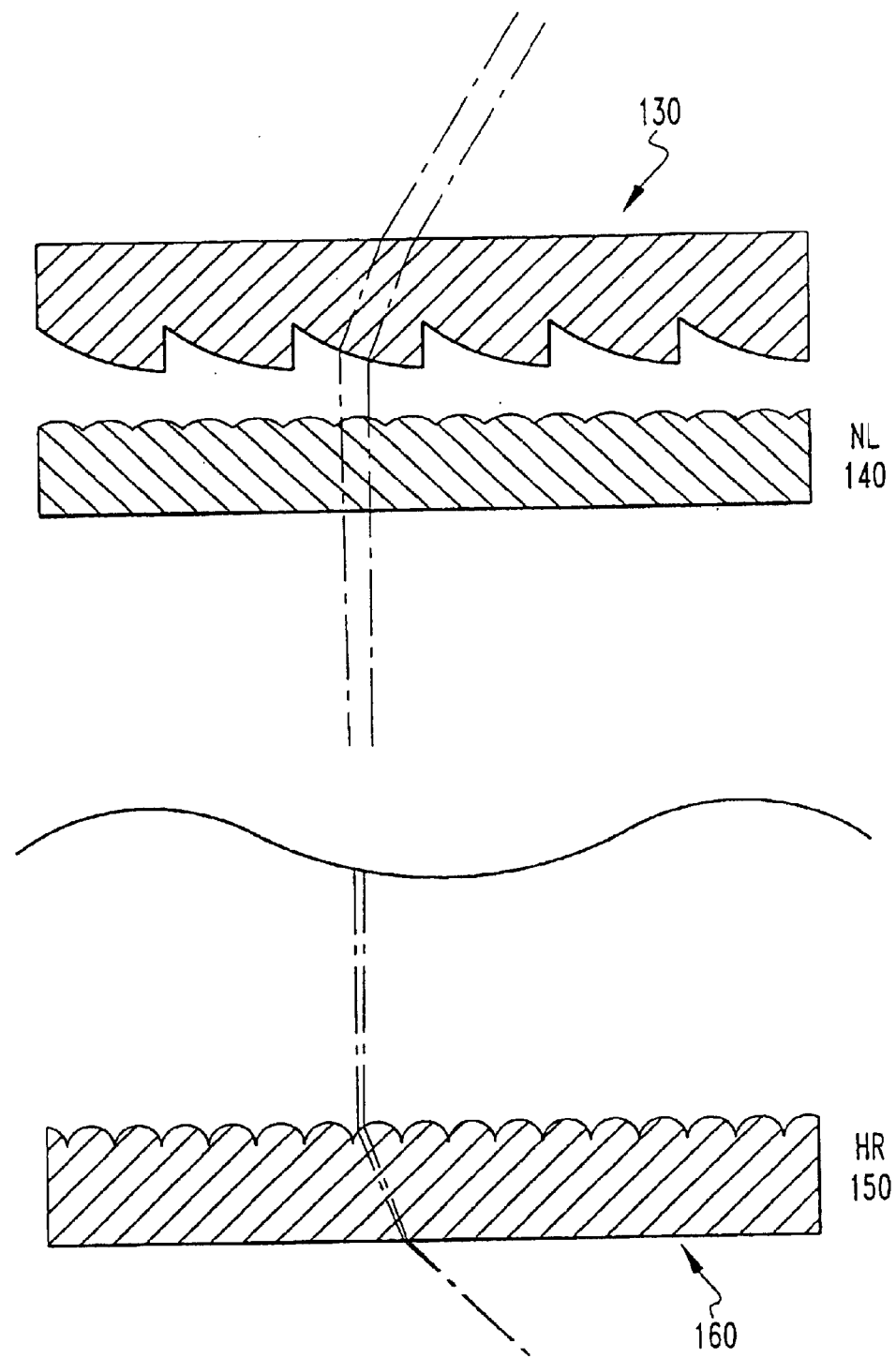
FIG. 21 is a representation of a top view of 2 light beams entering a point toward the left side of the display screen.

FIG. 21 shows a closeup top view of two light beams entering a point toward the left side of the display screen 20. The light first enters a fresnel lens 130, then the NR layer, then the HR layer. Light beams A and B arrive from different places on the projector lens 120 surface, and therefore will be sent out to different horizontal directions when they emerge from the display screen 20. The fresnel lens 130 first refracts both light beams so that they are perpendicular to the display screen 20 surface. Then the NL layer images both beams onto the HR layer. Then the HR layer refracts each beam into a different horizontal direction. Not shown here (because this figure is a top view) is a layer after the HR layer, that can be formed of horizontal lenticular lenses, which vertically scatters the light emerging from the HR layer.

A particular observer 40 standing in the space in front of the screen is able to see all or part of the image that originates from the projector 10 dedicated to that observer 40. There is an optimal viewing region in which the observer 40 can see the image from that projector 10 across the entire width of the screen, all the way from the left edge of the screen to the right edge of the screen. This will be the case where light from that projector 10 arrives at the observer's 40 position both from the right edge and from the left edge of the screen.

In the case where the screen is one meter wide, and where the horizontal fan-out from the HR layer is F1 (ie: where light from any pixel, at a distance of two meters from the screen, is visible within a horizontal span of two meters), then full visibility is achievable for any observer 40 who is at least a distance of two meters from the screen, and whose horizontal position is in the two meter wide region centered upon the screen. To observers 40 at this distance who are to the right of this region, the left edge of the image will appear to be cut off. Similarly, to observers 40 at this distance who are to the left of this region, the right edge of the image will appear to be cut off.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

-27-

APPENDIX

*Why a one dimensional nodal image would be inadequate*

A key attribute of the method of the Steerable Lightfield Projection display is the use of a two dimensional nodal image within the projector and within the microstructure of the display screen, to effect the one dimensional selectability of final horizontal exit angle of light emerging from the display screen. To understand why this is an essential feature of the method, it is useful to consider, by way of contrast, an alternate method which forms only a one dimensional, horizontal, nodal image structure at the nodal plane of the projection lens. Typically, this nodal image might consist of 64 narrow vertical stripes of brightness at the projection lens nodal plane. Each of these 64 stripes would then be mapped into a different horizontal light exit direction by the display screen microstructure.

A screen that can map this one dimensional nodal image into a selection of widely diverging horizontal exit directions can be constructed very simply by a rear surface layer (1) consisting of a lenticular lens array of long focal length $f_1$, and a front surface layer (2) consisting of a lenticular lens array of short focal length $f_2$. The thickness of the display screen is $f_1+f_2$. Let W be the width of each lenticular lenslet. For each lenticular lenslet, layer (1) converts the nodal image of vertical stripes from the projection lens into a small nodal image within the screen of D vertical stripes, at a distance of $f_1$ away from the rear surface of the screen. Then layer (2) converts the horizontal location of each vertical stripe of this nodal image into a different horizontal exit direction.

Analyzing the diffraction limit of this system, let us compute the narrowest lenticular lens width W which can resolve this nodal image. Given the same assumptions of an image of a 32mm wide square lens aperture at a distance of two meters (2000mm), we find from diffraction limitations that successive vertical stripes within the screen would need to be separated by at least 0.05mm (= 1.22 × 0.65microns × (2000mm/32mm)). If there are D = 64 such stripes, then the width W of each lenticular lenslet would need to be at least 64 × 0.05mm = 3.2mm.

In order to properly sample the intensity of each image pixel as seen by an observer, the Nyquist sampling theorem teaches that at least two lenslets would be required per image pixel. Therefore each projected image pixel would need to be at least 6.4mm wide. This sets a limit on the linear resolution per meter width of the display screen of at most about 160 (= 1000mm/6.4mm ) pixels.

Because the observer's interocular distance is approximately 65mm, each virtual slit needs to be no wider than about 32mm, to ensure that the image can selectively be sent to only one eye of the observer, while remaining invisible to the observer's other eye. For this reason, 64 viewing zones covers a viewing area at most 64x32mm, or approximately two meters, in width. This is sufficient for comfortable viewing of a one meter wide display screen. By the above calculations, this screen will, even in its theoretically ideal form, be able to support at most about 160 pixels across its width. In practice, the useful resolution will be less than this, since the diffraction limit is an ideal bound. Linearly increasing the width of the display screen requires a corresponding linear increase in the width of the viewing area, which requires a corresponding linear increase in the number of virtual slits that must be imaged behind each lenticular lenslet. This increase in the number of virtual slits requires, due to the diffraction limit, a corresponding linear increase in the size of each lenticular lenslet on the display screen surface. Therefore, no matter how large the display screen is scaled, the screen will still be able to support no more than about 160 display pixels across its width.

When multiple projectors are used for the eyes of multiple observers, as shown in figure 6, each projector is used to send an image to only one eye of one observer. To send N images to N eyes, N projectors are used. Each projector knows where its corresponding eye is. There are a number of well-known techniques for non-invasive eye position tracking. One is retroreflective spot tracking (in which a video camera looks for retroreflection of an infrared spot from observers' eyes). This is the technique employed by IBM's "Blue Eyes" system. Another is model-based video tracking, in which a software model has already been built of the arrangement of features on the human face, and then an interactive computer program interprets images that arrive from a video camera, to locate the features of the face (including eyes). This is the approach used, for example, by Visionics (http://www.visionics.com) and EyeMatic (http://www.eyematic.com), incorporated by reference herein.

Generally, multiple projectors do not interfere with each other, except in the following two cases:
(1) one observer stands directly in front of another, partially blocking the view of the screen for the first observer, or
(2) one observer's eye is positioned directly, vertically, above an eye of another observer, which rarely happens in social situations.

All of the light rays from the screen intended for one observer's eye converge horizontally from the screen to that observer's eye, which ensures no interference, except in the two abovementioned cases.

The projectors work independently of each other. Each projector is responsible only for forming and relaying an image to one eye of one observer. That projector does not need to coordinate with any of the other projectors.

In regarding to changing the projected image based on an eye location right-left relative to the screen and near or far relative to the screen, for each small region of pixels on the screen, calibrated software determines, based on the horizontal angle of the targeted observer's eye with respect to that screen pixel, from which one of D discrete horizontal exit angles light needs to emerge from that small portion of the screen, in order to subsequently travel toward the targeted observer's eye. By this process, a number between 1 and D is chosen for this small portion of the display screen. Let d denote this chosen direction. This information is used by the projector which is targeting that observer's eye, as follows:

The projector's Illumination Image is comprised of D Illumation Tiles. For each of these tiles, each region of that tile corresponds to the geometrically corresponding region of the display screen. In order to effect light traveling from a small portion of the display screen toward an observer who is in horizontal direction d, then, with respect to that small portion of the display screen, the geometrically corresponding portion of Illumination Tile d is illuminated, thereby sending light from that portion of the display screen to that observer.

Simultaneously, the same geometrically corresponding portions of all other Illumination Tiles within the Illumination Image are kept unilluminated. In this way, light from that portion of the display screen will not be sent into any other horizontal angular directions, and therefore will not be visible from the point of view of any other observer.

In conclusion, an approach based on a one-dimensional nodal image is not practical, because such an approach would result in a display having resolution too low to be of practical use. This demonstrates that it is necessary to use the approach of using a two dimensional nodal image, has been described in this document.

-33-

APPENDIX II

-34-

References

Actuality Systems: http://actuality-systems.com/

S. Benton, T.E. Slowe, A.B. Kropp, and S.L. Smith, Micropolarizer-based Multiple-Viewer Autostereoscopic display. SPIE Proceedings Volume 3639: Stereoscopic Displays and Virtual Reality Systems VI, (SPIE January 1999) paper 3639-10.

S. Benton. The Second Generation of the MIT Holographic Video System. In: J. Tsujiuchi, J. Hamasaki, and M. Wada, eds. +Proc. of the TAO First International Symposium on Three Dimensional Image Communication Technologies. Tokyo, 6-7 December 1993. Telecommunications Advancement Organization of Japan, Tokyo, 1993, pp. S-3-1-1 to -6.

R. Börner. Three Autostereoscopic 1.25m Diagonal Rear Projection Systems with Tracking Features. IDW'97, Proc. of 4$^{th}$ Int'l Display Workshop, Nagoya, Japan, Nov. 1997, p. 835-838.

S. Chen and L. Williams. View Interpolation for Image Synthesis. Computer Graphics (SIGGRAPH 93 Conference Proc.) p. 279-288.

Displaytech: http://www.displaytech.com/shutters.html

Elizabeth Downing et al. A Three-Color, Solid-State, Three-Dimensional Display. Science 273,5279 (Aug. 30, 1996), pp. 1185-118.

D. Drascic, J. Grodski. Defence Teleoperation and Stereoscopic Video. Proc. SPIE Vol. 1915, Stereoscopic Displays and Applications IV, pages 58-69, San Jose, California, Feb. 1993.

J. Eichenlaub. Multiperspective Look-around Autostereoscopic Projection Display using an ICFLCD. Proc. SPIE Vol. 3639, p. 110-121, Stereoscopic Displays and Virtual Reality Systems VI, John O. Merritt; Mark T. Bolas; Scott S. Fisher, Eds.

J. Eichenlaub. Lightweight Compact 2D/3D Autostereoscopic LCD Backlight for Games, Monitor, and Notebook Applications. Proc. SPIE Vol. 3295, p. 180-185, in Stereoscopic Displays and Virtual Reality Systems V, Mark T. Bolas; Scott S. Fisher; John O. Merritt; Eds. April 1998.

M. Fückner: http://www.almaden.ibm.com/cs/blueeyes/find.html

M. Grewal, A. Andrews, Kalman Filtering: Theory and Practice, Prentice Hall, 1993.

T. Kanade et al. Development of a Video Rate Stereo Machine. Proc. of International Robotics and Systems Conference (IROS-95), Pittsburgh, PA, August 7-9, 1995.

L. Lipton, et al., U.S. Patent #4,523,226, Stereoscopic Television System, June 11, 1985.

L. Lipton, and J. Halnon. Universal Electronic Stereoscopic Display, Stereoscopic Displays and Virtual Reality Systems III, Vol. 2653, pp. 219-223, SPIE, 1996.

LXD: http://www.lxdinc.com/

J.R. Moore, N.A. Didgson, A.R.L. Travis and S.R. Lang. Time-Multiplexed Color Autostereoscopic Display. Proc. SPIE 2653, SPIE Symposium on Stereoscopic Displays and Applications VII, San Jose, California, Jan. 28-Feb. 2, 1996, pp. 10-19.

Okoshi, T. Three-Dimensional Imaging Techniques. Academic Press. New York 1976. ISBN 0-12-525250-1.

Origin Systems: http://www.orin.com/3dtrack/dyst.htm

A. Schwerdtner and H. Heidrich. Dresden 3D display (D4D). SPIE Vol. 3295, p. 203-210, Stereoscopic Displays and Virtual Reality Systems V, Mark T. Bolas; Scott S. Fisher; John O. Merritt; Eds.

P. St.-Hillaire, M. Lucente, J.D. Sutter, R. Pappu, C.J. Sparreil, and S. Benton. Scaling up the MIT Holographic Video System. Proc of the Fifth International Symposium on Display Holography (Lake Forest College, July 18-22, 1994), SPIE, Bellingham, WA, 1995.

Texas Instruments: http://www.ti.com/dlp

R. Williams. Volumetric Three Dimensional Display Technology in D. McAllister (Ed.) Stereo Computer Graphics and other True 3D Technologies, 1993.

G. J. Woodgate, D. Ezra, et al. Observer-tracking Autostereoscopic 3D display systems. Proc. SPIE Vol. 3012, p. 187-198, Stereoscopic Displays and Virtual Reality Systems IV, Scott S. Fisher; John O. Merritt; Mark T. Bolas; Eds.

Xilinx: http://www.xilinx.com/

All of these references are incorporated by reference herein.

-36-

See also U.S. Patent 6,239,830 filed May 17, 1999; which is a continuation-in-part of U.S. Patent 6,061,084 filed on January 21, 1998, both of which are incorporated by reference herein.

What is claimed is:

1. An apparatus for showing images in a room comprising:
   a screen; and
   means for displaying a distinct and separate steroscopic image for each of a number of different observers simultaneously on the screen as the observers move around to different locations in the room at any distance in front of the screen.

2. An apparatus as described in claim 1 wherein the displaying means displays a distinct and separate image independently for each eye of the number of different observers simultaneously on the screen, so that each observer can see an image stereoscopically.

3. An apparatus as described in claim 2 wherein the screen is a passive display screen.

4. An apparatus as described in claim 2 wherein the displaying means displays on the screen a separate and distinct image for each eye of the observers, where each of the observers are at varying distances away from the screen and at varying distances left-to-right with respect to the screen.

5. An apparatus as described in claim 2 wherein the displaying means forms a four dimensional lightfield which the screen converts to a three-dimensional lightfield.

6. An apparatus as described in claim 3 wherein the displaying means includes at least one projector.

7. An apparatus as described in claim 6, wherein the displaying means includes a virtual slit image disposed between the projector and the observers.

8. An apparatus as described in claim 6, wherein the projector comprises a lamp and a condenser adjacent a lamp.

9. An apparatus as described in claim 8, wherein the projector comprises an illuminator image adjacent the condenser, illuminator image condensers adjacent the illuminator image, relay lenses adjacent to the illuminator image condensers, a spatial light modulator disposed between the illuminator image condensers, and a computer in communication with and in control of the illuminator image and a spatial light modulator.

10. An apparatus as described in claim 9, wherein the projector includes lenses adjacent the relay lenses and spatial light modulator.

11. An apparatus as described in claim 10, wherein the spatial light modulator is differently attenuated according to computer-modulated time-varying instructions from the computer so as to form a sequence of images over time.

12. An apparatus as described in claim 11, wherein the illuminator image is partitioned by the computer into illuminator tiles where each illuminator tile maps into a corresponding region on the screen.

13. An apparatus as described in claim 3 wherein the displaying means includes a plurality of projectors, with each projector corresponding to each eye of an observer.

14. An apparatus as described in the claim 3 wherein the screen includes a Fresnel screen layer which receives the image from the displaying means and a nodal lenslet layer that is adjacent the Fresnel screen layer.

15. An apparatus as described in claim 14, wherein the screen includes a horizontal router layer that is adjacent the nodal lenslets layer, and a vertical diffusion layer adjacent the horizontal router layer.

16. A method for showing images in a room comprising the steps of:
   moving an observer around the room to different locations in the room at any distance in front of a passive screen;
   displaying a first image onto the passive screen oriented for a first eye of an observer to see at each of the locations; and
   displaying a second image separate and distinct from the first image onto the screen oriented for a second eye of the observer to see at each of the locations.

17. A method as described in claim 16, including the step of displaying a third image separate and distinct from the first and second images onto the screen oriented for a first eye of another observer to see; and displaying a fourth image separate and distinct from the first, second and third images onto the screen oriented for a second eye of another observer to see.

18. A method as described in claim 17, wherein the displaying a first image step includes the steps of forming a four dimensional lightfield in regard to the image with a projector, and converting the four dimensional lightfield to a three dimensional lightfield with the screen.

19. An apparatus for showing images comprising:
   a passive display screen; and
   means for displaying a distinct and separate image independently for each eye of a number of different observers simultaneously on the screen, so that each observer can see an image steroscopically, the screen includes a Fresnel screen layer which receives the image from the displaying means and a nodal lenslet layer that is adjacent the Fresnel layer.

20. An apparatus for showing images comprising:
   a passive display screen; and
   means for displaying a distinct and separate image independently for each eye of the number of different observers simultaneously on the screen, so that each observer can see an image steroscopically, the displaying means includes at least one projector, the projector comprises a lamp and a condenser adjacent a lamp.

21. An apparatus for showing images comprising:
   a passive display screen; and
   means for displaying a distinct and separate image independently for each eye of the number of different observers simultaneously on the screen, so that each observer can see an image steroscopically, the displaying means includes at least one projector, the projector includes lenses adjacent the relay lenses and spatial light modulator.

22. An apparatus for showing images comprising:
   a screen; and
   means for displaying and separate image independently for each eye of the number of different observers simultaneously on the screen, so that each observer can see an image steroscopically, the displaying means forms a four dimensional lightfield which the screen converts to a three-dimensional lightfield.

23. A method for showing images comprising the steps of:
   displaying a first image onto a passive screen oriented for a first eye of an observer to see by forming a four dimensional lightfield in regard to the image with a projector, and covering the four dimensional lightfield to a three dimensional lightfield with the screen;
   displaying a second image separate and distinct from the first image onto the screen oriented for a second eye of the observer to see; and
   displaying a third image separate and distinct from the first and second images onto the screen oriented for a first eye of another observer to see; and displaying a fourth image separate and distinct from the first, second and third images onto the screen oriented for a second eye of another observer to see.

* * * * *